United States Patent
Michaels et al.

(10) Patent No.: US 8,320,557 B2
(45) Date of Patent: Nov. 27, 2012

(54) CRYPTOGRAPHIC SYSTEM INCLUDING A MIXED RADIX NUMBER GENERATOR WITH CHOSEN STATISTICAL ARTIFACTS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 863 days.

(21) Appl. No.: 12/117,086

(22) Filed: May 8, 2008

(65) Prior Publication Data

US 2009/0279690 A1    Nov. 12, 2009

(51) Int. Cl.
*H04K 1/00* (2006.01)
*H04L 9/00* (2006.01)
*H04L 9/28* (2006.01)

(52) U.S. Cl. .................... 380/28; 370/316; 370/326
(58) Field of Classification Search .............. 380/28
See application file for complete search history.

(56) References Cited

U.S. PATENT DOCUMENTS

| | | | |
|---|---|---|---|
| 3,564,223 A | 2/1971 | Harris et al. | |
| 4,646,326 A | 2/1987 | Backof, Jr. et al. | |
| 4,703,507 A | 10/1987 | Holden | |
| 4,893,316 A | 1/1990 | Janc et al. | |
| 5,007,087 A | 4/1991 | Bernstein et al. | |
| 5,048,086 A | 9/1991 | Bianco et al. | |
| 5,077,793 A | 12/1991 | Falk et al. | |
| 5,210,770 A | 5/1993 | Rice | |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,596,600 A | 1/1997 | Dimos et al. | |

(Continued)

FOREIGN PATENT DOCUMENTS

EP    0 849 664 A2    6/1998

(Continued)

OTHER PUBLICATIONS

Michaels, Alan J., et al., Mixed Radix Number Generator With Chosen Statistical Artifacts, U.S. Appl. No. 11/759,276, filed Jun. 6, 2007.

(Continued)

*Primary Examiner* — Taghi Arani
*Assistant Examiner* — Mahfuzur Rahman
(74) *Attorney, Agent, or Firm* — Fox Rothschild, LLP; Robert J. Sacco

(57) ABSTRACT

A cryptographic system (1000) is provided. The cryptographic system includes a data stream receiving means (DSRM), a number generator (NG), a mixed radix accumulator (MRA) and an encryptor. The DSRM (1002) receives a data stream (DS). The NG (702) generates a first number sequence (FNS) contained within a Galois Field GF[M]. The MRA (750) is configured to perform a first modification to a first number (FN) in FNS. The first modification involves summing the FN with a result of a modulo P operation performed on a second number in FNS that proceeds FN. The MRA is also configured to perform a second modification to FN utilizing a modulo P operation. The MRA is further configured to repeat the first and second modification for numbers in FNS to generate a second number sequence (SNS). The encryptor (1004) is configured to generate a modified data stream by combining SNS and DS.

22 Claims, 13 Drawing Sheets

U.S. PATENT DOCUMENTS

| | | |
|---|---|---|
| 5,598,476 A * | 1/1997 | LaBarre et al. ............... 713/171 |
| 5,646,997 A | 7/1997 | Barton |
| 5,677,927 A | 10/1997 | Fullerton et al. |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A | 7/1999 | Abarbanel et al. |
| 5,924,980 A | 7/1999 | Coetzee |
| 5,937,000 A | 8/1999 | Lee et al. |
| 6,014,446 A | 1/2000 | Finkelstein |
| 6,023,612 A | 2/2000 | Harris et al. |
| 6,038,317 A * | 3/2000 | Magliveras et al. ............ 380/28 |
| 6,078,611 A | 6/2000 | La Rosa et al. |
| 6,141,786 A | 10/2000 | Cox et al. |
| 6,212,239 B1 | 4/2001 | Hayes |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,331,974 B1 | 12/2001 | Yang et al. |
| 6,377,782 B1 | 4/2002 | Bishop et al. |
| 6,473,448 B1 | 10/2002 | Shono et al. |
| 6,570,909 B1 | 5/2003 | Kansakoski et al. |
| 6,614,914 B1 | 9/2003 | Rhoads et al. |
| 6,665,692 B1 * | 12/2003 | Nieminen .................... 708/250 |
| 6,732,127 B2 | 5/2004 | Karp |
| 6,744,893 B1 | 6/2004 | Fleming-Dahl |
| 6,754,251 B1 | 6/2004 | Sriram et al. |
| 6,766,345 B2 * | 7/2004 | Stein et al. ................... 708/492 |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 | 3/2005 | Sourour |
| 6,888,813 B1 | 5/2005 | Kishi |
| 6,901,104 B1 | 5/2005 | Du et al. |
| 6,937,568 B1 | 8/2005 | Nicholl et al. |
| 6,980,656 B1 | 12/2005 | Hinton, Sr. et al. |
| 6,980,657 B1 | 12/2005 | Hinton, Sr. et al. |
| 6,986,054 B2 | 1/2006 | Kaminaga et al. |
| 6,993,016 B1 * | 1/2006 | Liva et al. .................... 370/356 |
| 6,999,445 B1 | 2/2006 | Dmitriev et al. |
| 7,023,323 B1 | 4/2006 | Nysen |
| 7,027,598 B1 | 4/2006 | Stojancic et al. |
| 7,035,220 B1 | 4/2006 | Simcoe |
| 7,069,492 B2 | 6/2006 | Piret et al. |
| 7,076,065 B2 | 7/2006 | Sherman et al. |
| 7,078,981 B2 | 7/2006 | Farag |
| 7,079,651 B2 | 7/2006 | Den Boer et al. |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 * | 3/2007 | Wu ............................... 370/316 |
| 7,200,225 B1 * | 4/2007 | Schroeppel .................... 380/28 |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 | 5/2010 | Feher |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 | 4/2011 | Ozluturk et al. |
| 7,974,146 B2 | 7/2011 | Barkley |
| 7,974,176 B2 * | 7/2011 | Zheng .......................... 370/203 |
| 2001/0017883 A1 | 8/2001 | Tiirola et al. |
| 2002/0012403 A1 | 1/2002 | McGowan et al. |
| 2002/0034191 A1 | 3/2002 | Shattil |
| 2002/0034215 A1 | 3/2002 | Inoue et al. |
| 2002/0041623 A1 | 4/2002 | Umeno |
| 2002/0054682 A1 | 5/2002 | Di Bernardo et al. |
| 2002/0099746 A1 | 7/2002 | Tie et al. |
| 2002/0110182 A1 | 8/2002 | Kawai |
| 2002/0115461 A1 | 8/2002 | Shiraki et al. |
| 2002/0122465 A1 | 9/2002 | Agee et al. |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1 | 1/2003 | Lambert |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1 | 9/2003 | Johnson et al. |
| 2003/0198184 A1 | 10/2003 | Huang et al. |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1 | 5/2004 | Hartson et al. |
| 2004/0146095 A1 | 7/2004 | Umeno et al. |
| 2004/0156427 A1 | 8/2004 | Gilhousen et al. |
| 2004/0161022 A1 | 8/2004 | Glazko et al. |
| 2004/0165681 A1 | 8/2004 | Mohan |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 * | 2/2005 | Samid ............................ 380/28 |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 | 6/2005 | Zhengdi et al. |
| 2005/0207574 A1 | 9/2005 | Pitz et al. |
| 2005/0249271 A1 | 11/2005 | Lau et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0072754 A1 | 4/2006 | Hinton et al. |
| 2006/0088081 A1 | 4/2006 | Withington et al. |
| 2006/0093136 A1 | 5/2006 | Zhang et al. |
| 2006/0123325 A1 * | 6/2006 | Wilson et al. ................. 714/781 |
| 2006/0209926 A1 | 9/2006 | Umeno et al. |
| 2006/0209932 A1 | 9/2006 | Khandekar et al. |
| 2006/0251250 A1 | 11/2006 | Ruggiero et al. |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 | 6/2007 | Koslar |
| 2007/0195860 A1 | 8/2007 | Yang et al. |
| 2007/0201535 A1 | 8/2007 | Ahmed |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 * | 1/2008 | Lablans ........................ 714/777 |
| 2008/0075195 A1 | 3/2008 | Pajukoski et al. |
| 2008/0080439 A1 | 4/2008 | Aziz et al. |
| 2008/0084919 A1 | 4/2008 | Kleveland et al. |
| 2008/0095215 A1 | 4/2008 | McDermott et al. |
| 2008/0107268 A1 | 5/2008 | Rohde et al. |
| 2008/0198832 A1 | 8/2008 | Chester |
| 2008/0204306 A1 | 8/2008 | Shirakawa |
| 2008/0263119 A1 | 10/2008 | Chester et al. |
| 2008/0294707 A1 | 11/2008 | Suzuki et al. |
| 2008/0294710 A1 | 11/2008 | Michaels |
| 2008/0294956 A1 | 11/2008 | Chester et al. |
| 2008/0304553 A1 | 12/2008 | Zhao et al. |
| 2008/0304666 A1 | 12/2008 | Chester et al. |
| 2008/0307022 A1 | 12/2008 | Michaels et al. |
| 2008/0307024 A1 | 12/2008 | Michaels et al. |
| 2009/0022212 A1 | 1/2009 | Ito et al. |
| 2009/0034727 A1 | 2/2009 | Chester et al. |
| 2009/0044080 A1 | 2/2009 | Michaels et al. |
| 2009/0059882 A1 | 3/2009 | Hwang et al. |
| 2009/0110197 A1 | 4/2009 | Michaels |

| | | | |
|---|---|---|---|
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0285395 | A1 | 11/2009 | Hu et al. |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0316679 | A1 | 12/2009 | Van Der Wateren |
| 2009/0323766 | A1 | 12/2009 | Wang et al. |
| 2009/0327387 | A1 | 12/2009 | Michaels et al. |
| 2010/0030832 | A1 | 2/2010 | Mellott |
| 2010/0054225 | A1 | 3/2010 | Hadef et al. |
| 2010/0073210 | A1 | 3/2010 | Bardsley et al. |
| 2010/0111296 | A1* | 5/2010 | Brown et al. .................. 380/28 |
| 2010/0142593 | A1 | 6/2010 | Schmid |
| 2010/0254430 | A1 | 10/2010 | Lee et al. |
| 2010/0260276 | A1 | 10/2010 | Orlik et al. |
| 2011/0222393 | A1 | 9/2011 | Kwak et al. |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 7140983 A | 6/1995 |
| JP | 2001255817 A | 9/2001 |
| JP | 2004279784 A | 10/2004 |
| JP | 2005017612 A | 1/2005 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007—Spring. IEEE 65$^{TH}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. _1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 2 Oct. 2, 2002,Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld—AWolfram Web Resource [online] [retrieved on Nov. 8, 2010] Retrieved from the Internet: http://mathworld.wolfram.com/injection.html>.

Harris Corp., International Search Report mailed Feb. 11, 2010, U.S. Appl. No. PCT/US2009/059948.

Harris Corp., International Search Report mailed Apr. 13, 2010, U.S. Appl. No. PCT/US2009/0069121.

Harris Corp., International Search Report mailed Apr. 13, 2010, U.S. Appl. No. PCT/US2009/0069118.

Harris Corp., European Search Report mailed Mar. 4, 2010, Patent Application No. 08009745.4.

Abel, et al., "Chaos Communications—Principles, Schemes, and System Analysis" Proceedings for the IEEE, IEEE. New York, NY. vol. 90, No. 5, May 1, 2002, XP011064997, ISSN: 0018-9219.

Barile, Margherita, "Bijective," From MathWorld—A Wolfram Web Resource created by Eric W. Weisstein. http://mathworld.wolfram.com/Bijective.html, Nov. 8, 2010.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-26211, XP002499416, ISSN: 1063-651X. Retrieved from the Internet: URL:http://prola.aps.org/pdf/PRE/v69/i2/e026201 [retrieved Oct. 13, 2008].

Nakamura, et al, "Chaotic synchronization-based communications using constant envelope pulse" Electrical Engineering in Japan, [Online] vol. 163, No. 3, Feb. 12, 2008 , pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html, Nov . 8, 2010.

Weisstein, Eric W. "Surjection," From MathWorld—AWolfram Web Resource, http://mathworld.wolfram.com/Surjection.html, Nov. 8, 2010.

Morsche et al., "Signals and Systems," lecture notes, University of Eindhoven, The Netherlands (1999).

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "BIT Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Taylor, F.J., "Residue Arithmetic A Tutorial with Examples", Computer, vol. 17, No. 5, pp. 50-62, May 1984, doi: 10.1109/MC. 1984. 1659138.

Popescu, Angel, A Galois Theory for the Field Extension K ((X))/K., Glasgow Mathematical Journal; Sep. 2010, vol. 52 Issue 3, pp. 447-451, 5 p.

Pirkin, Ilya, Calculations in Galois Fields., C/C++ Users Journal; Oct. 2004, vol. 22 Issue 10, pp. 14-18, 4 p, 1 Color Photograph.

Diaz-Toca, G.M. and Lombardi, H. , Dynamic Galois Theory., Journal of Symbolic Computation; Dec. 2010, vol. 45 Issue 12, p1316-1329, 14 p.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p209-213, 5 p, 2 Diagrams, 3 Charts.

Pirkin, Llya, Calculations in Galois Fields., C/C++ Users Journal; Oct. 2004, vol. 22 Issue 10, p14-18, 4 p, 1 Color Photograph.

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec 1984.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

International Search Report mailed Jul. 22, 2011, Application Serial No. PCT/US2009/042706; Filing Date May 4, 2009, in the name of Harris Corporation.

Office Action issued in Japanese Patent Application No. 2010-504206 in the name of Harris Corporation; mailed Jan. 6, 2012.

Bender, et al., "Techniques for data hiding", 1995, IBM Systems Journal, vol. 35, pp. 313-336.

* cited by examiner

CRYPTOGRAPHIC SYSTEM INCLUDING A MIXED RADIX NUMBER GENERATOR WITH CHOSEN STATISTICAL ARTIFACTS

BACKGROUND OF THE INVENTION

1. Statement of the Technical Field

The inventive arrangements relate to cryptographic systems employing mixed radix conversion. More particularly, the inventive arrangements relate to a method and system for performing a mixed radix ring generation and conversion to produce a random number sequence with chosen statistical characteristics over all equivalence classes of a Galois field GF[P].

2. Description of the Related Art

Cryptographic systems can include ring generators in numerous applications. A ring generator is a simple structure over a finite field that exhaustively produces possible outputs through repeated mapping. The mapping is some combination of an additive and a multiplicative mapping, with irreducible polynomials being ideal. For example, a ring generator includes repeated computations of an irreducible polynomial $f(x)=3x^3+3x^2+x$ on a finite Galois field GF[11] containing eleven (11) elements. A finite or Galois field GF[P] is a field that contains only a finite number of elements $\{0, 1, 2, \ldots, P-1\}$. The finite or Galois field GF[P] has a finite field size defined by the Galois characteristic P, which is often chosen to be a prime number based on number theoretical consequences. The computations are typically implemented in digital hardware as lookup table operations, feedback loops, or multiplier structures.

Despite the advantages of such a ring generator, it suffers from certain drawbacks. For example, if the ring generator's Galois characteristic P is chosen to be a prime number (not equal to two), then computation is typically inefficient in a digital (binary) domain. Also, lookup table operations performed in the finite or Galois field GF[P] are memory intensive if the Galois characteristic P is large. Moreover, the ring generator's output values are highly deterministic. As such, knowledge of a mapping and current finite field conditions gives complete knowledge of an output sequence.

One method to mask the output sequence of a ring generator from unintended re-construction is to combine two or more ring generators via algorithms that perform bijective mappings into a larger effective domain. An example of this combination is through the Chinese Remainder Theorem (CRT) when the Galois characteristics of the individual ring generators are mutually prime. Another method is to simply truncate the ring generator output value by performing a mixed-radix conversion from a domain GF[P] to a binary domain $GF[2^k]$. Both of these masking methods partially mask the original sequence, yet they still present statistical artifacts that may be used to re-engineer the sequence values. In cryptology, such an attempt is often called a frequency attack, whereby an individual can obtain partial information of the pseudo-random sequence mapping and state characteristics through statistical analysis. A common layman's example of this process is the word puzzles that exchange one letter for another. Knowledge of the English language gives partial knowledge that E's are more prevalent than Z's. In effect, the search is reduced from brute force to a more logical one.

In view of the forgoing, there remains a need for a cryptographic system implementing a mixed-radix conversion method that is computationally efficient in a digital (binary) domain. There is also a need for a cryptographic system implementing a mixed-radix conversion method that does not have any gross statistical artifacts. There is further a need for a cryptographic system comprising a ring generator that: (a) has an implementation that is less hardware intensive than conventional ring generator implementations; (b) yields a pseudo-random number sequence that has chosen statistical characteristics; and/or (c) has orbits that appear non-deterministic.

SUMMARY OF THE INVENTION

The invention generally concerns a cryptographic system configured to encrypt an input data stream and decrypt an encrypted data stream. In this regard, it should be understood that the cryptographic system is comprised of an encryption sequence generator and an encryptor. The encryption sequence generator is configured to generate an encryption sequence. The encryptor is configured to produce an encrypted data stream by combining an input data stream with the encryption sequence. The cryptographic system is also comprised of a decryption sequence generator and a decryptor. The decryption sequence generator is configured to generate a decryption sequence. The decryptor is configured to decrypt the encrypted data stream by performing a decryption method utilizing the encrypted data stream and the decryption sequence.

According to an aspect of the invention, the encryption sequence generator is comprised of a number generator and mixed radix accumulator. The number generator is configured to generate a first sequence of numbers contained within a Galois field GF[M]. The mixed radix accumulator is electronically connected to the number generator. The mixed radix accumulator is configured to perform a first modification to a first number in the first sequence of numbers. The first modification is achieved by summing the first number with a result of a first modulo P operation performed on a second number of the first sequence that precedes the first number. The mixed radix accumulator is also configured to perform a second modification to the first number. The second modification is comprised of a second modulo P operation. The second modification is performed subsequent to the first modification. The mixed radix accumulator is further configured to repeat the first and second modifications for a plurality of numbers of the first sequence of numbers to generate a second sequence of numbers. The second sequence of numbers is the encryption sequence.

According to an aspect of the invention, the number generator is comprised of a pseudo-random number generator. The pseudo-random number generator generates a pseudo-random sequence of numbers containing statistical artifacts relating to the generation of the first sequence of numbers. The statistical artifact is eliminated by the mixed radix accumulator.

According to another aspect of the invention, the encryptor includes at least one of a multiplier, an adder, a digital logic device and a feedback mechanism. The encryptor is further configured to perform a standard multiplication operation, a multiplication in a Galois extension field operation, an addition modulo q operation, a subtraction modulo q operation or a bitwise logic operation. The decryption sequence generator is comprised of a second number generator and a second mixed radix accumulator. The second number generator and a second mixed radix accumulator are configured in combination to generate the decryption sequence.

A correlation-based cryptographic system is also provided. This cryptographic system is comprised of a data stream source, a mixed radix accumulator and a decryption device. The data stream source is configured to generate an input data stream of a dynamic range M. The input data stream includes a first sequence of numbers with a known non-uniform probability distribution. The mixed radix accumulator is electronically connected to the data stream source. The mixed radix accumulator is configured to perform a first modification to a first number in the first sequence of numbers. This modification involves summing the first number with a result of a modulo P operation performed on a second number of the first sequence. The second number precedes the first number. M is relatively prime with respect to P. The mixed radix accumulator is also configured to perform a second modification to the first number comprising a modulo P operation. The second modification is performed subsequent to the first modification. The mixed radix accumulator is further configured to repeat the first and second modification for numbers of the first sequence of numbers to generate a second sequence of numbers. The decryption device is coupled to the mixed radix accumulator and is configured to produce decrypted data by performing a decryption method. The decryption method can implement a correlation-based mathematical structure, such as a Hidden Markov Model.

A method is further provided for encrypting and decrypting an input data stream. The method generally includes the steps of generating a first sequence of numbers contained within a Galois field GF[M] and performing a first modification to a first number in the first sequence of numbers. The first modification involves summing the first number with a result of a first modulo P operation performed on a second number of the first sequence, where the second number precedes the first number and M is relatively prime with respect to P. Thereafter, a second modification to the first number is performed. The second modification involves performing a second modulo P operation. The first and second modifications are repeated for a plurality of numbers of the first sequence of numbers to generate a second sequence of numbers. The second sequence of numbers is combined with the input data stream to generate a modified data stream (i.e., an encrypted data stream). Subsequent to generating a modified data stream, a decryption sequence is generated and a decryption method is performed. The decryption method generally involves combining the decryption sequence with the modified data stream to generate a decrypted data stream.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
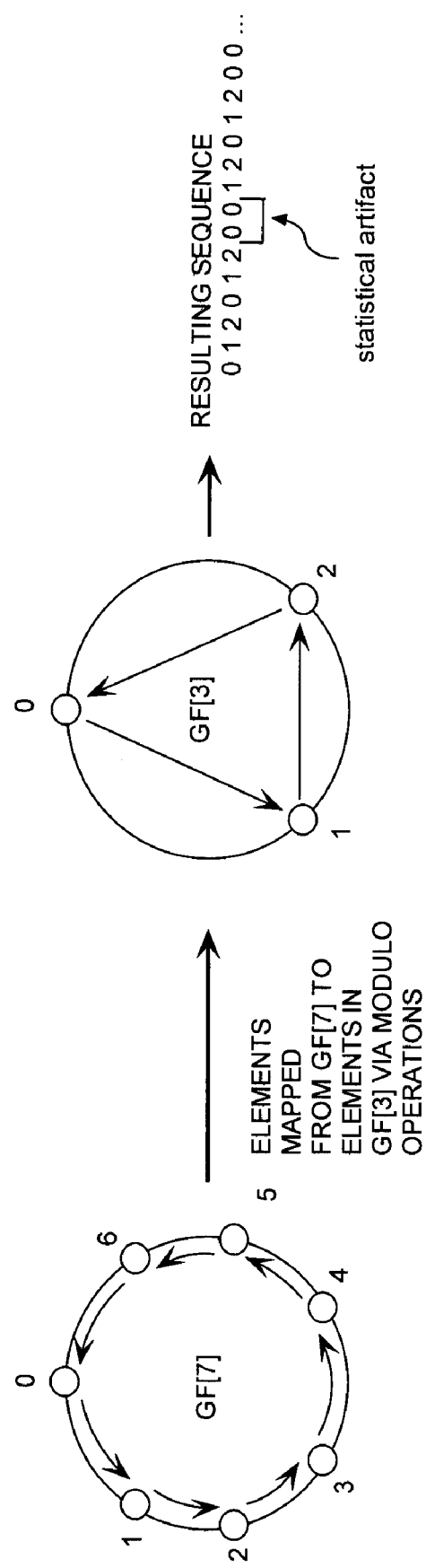
FIG. 1 is a conceptual diagram of a conventional mixed radix conversion algorithm that is useful for understanding the invention.

Referring now to FIG. 1, there is provided a conceptual diagram of a conventional mixed radix conversion algorithm that is useful for understanding the invention. In cryptographic systems, various algorithms are employed for combining a number sequence with a data stream. This combining process can be performed for encrypting or masking the data stream prior to its storage or transmission over a communications link. Such algorithms can include residue number system (RNS) operations for expressing each number of the number sequence in a Galois field GF[M] base. The finite or Galois field GF[M] has a finite field size defined by the Galois characteristic M. A Galois field GF[M] is a field that contains only a finite number of elements $\{0, 1, 2, \ldots, M-1\}$. As such, all arithmetic operations performed in the finite or Galois field result in an element within that field. As such, a resulting sequence of a Galois field GF[M] operation can repeat every $(M+1)^{th}$ element. These RNS operations are well known to persons skilled in the art, and therefore will not be described in detail herein. However, it should be understood that these RNS operations can require a mixed radix conversion. The phrase "mixed radix conversion" as used herein refers to a conversion of a number sequence from a first number base (or radix) to a second number base (or radix). For example, a number sequence expressed in a Galois field GF[7] base is converted to a number sequence expressed in a Galois field GF[3] base as depicted in FIG. 1. Typically, mixed-radix conversion produces statistical artifacts whenever the destination radix is smaller than and does not evenly divide the starting radix.

Notably, there is a statistical non-uniformity in the statistical distribution resulting from a number sequence conversion from a first Galois field $GF[M_1]$ base to a second Galois field $GF[M_2]$ base when the two (2) number bases are not evenly divisible. For example, a random number sequence expressed in a Galois field GF[7] base is mapped to a number sequence expressed in a Galois field GF[3] base. The random number sequence expressed in a Galois field GF[7] base is defined by the set of elements $\{0, 1, 2, \ldots, 6\}$. Similarly, the number sequence expressed in a Galois field GF[3] base is defined by the set of elements $\{0, 1, 2\}$. Mapping the number sequence expressed in a Galois field GF[7] base to a number sequence expressed in the Galois field GF[3] base generally involves segmenting each element $\{0, 1, 2, \ldots, 6\}$ by their corresponding equivalence class modulo three (3). Since the Galois field GF[3] is a finite field that contains only a finite number of elements {0, 1, 2}, there is a corresponding equivalence class for the integers zero (0), one (1), and two (2).

The mapping operations of the elements from the Galois field GF[7] to elements in a Galois field GF[3] are listed in the following Table (1).

TABLE 1

| Elements From A Galois Field GF[7]: | Mapping Operations: | Equivalent Elements In A Galois Field GF[3]: |
| --- | --- | --- |
| 0 | 0 modulo 3 | 0 |
| 1 | 1 modulo 3 | 1 |
| 2 | 2 modulo 3 | 2 |
| 3 | 3 modulo 3 | 0 |
| 4 | 4 modulo 3 | 1 |
| 5 | 5 modulo 3 | 2 |
| 6 | 6 modulo 3 | 0 |

As illustrated in Table 1, the mapping operations result in a non-uniform distribution of the elements over the Galois field GF[3]. Specifically, the resulting sequence of the mapping operations is defined as {0 1 2 0 1 2 0}. There are three elements {0, 3, 6} from the Galois field GF[7] in an equivalence class for the integer zero (0). There are two (2) elements {1, 4} from the Galois field GF[7] in an equivalence class for the integer one (1). There are two (2) elements {2, 5} from the Galois field GF[7] in an equivalence class for the integer two (2).

By utilizing a statistical analysis, an outside party can gain partial information from a cryptographic system implementing the conventional mixed radix conversion algorithm (described above in relation to FIG. 1) and can more easily identify an original number sequence from a data stream altered by a resulting number sequence of the mapping operations. For example, if one knows the sizes of the two (2) number bases, then the attacker can use the statistical proportion of elements in the various equivalence classes to more easily identify the original number sequence from the altered data stream. Moreover, knowledge of the data message format will coincide in a statistically significant fashion with the statistical artifacts of the random number sequence. In effect, more information is provided in the data message content. As used herein, the term "statistically significant" refers to a mathematical assurance of the validity of some piece of information. As such, it is desirable to remove statistical artifacts from results derived by a mixed radix conversion algorithm so that identifying an original number sequence from an altered data stream is relatively difficult.

Accordingly, some embodiments of the present invention provide a method for removing unwanted statistical artifacts in a mixed radix conversion. One method generally includes spreading statistical artifacts evenly over all equivalence classes of a Galois field GF[P]. This even distribution of statistical artifacts can be accomplished by using a mixed-radix ring generator process. The process involves (1) generating a first random number sequence utilizing an algebraic structure defined by a Galois field GF[M], (2) modifying each random number of the first random number sequence by adding a previously computed remainder via a modulo P operation, and (3) generating a second random number sequence utilizing the modified random numbers. The second random number sequence is also generated utilizing a modulo P operation. The second random number sequence includes statistical artifacts that are distributed evenly over all equivalence classes of the Galois field GF[P].

It should be understood that such a mixed radix number generator process provides stochastic adherence to desired statistical properties rather than unconditional adherence to desired statistical properties. The phrase "stochastic adherence" refers to a behavior that converges to an ideal. The phrase "unconditional adherence" refers to a level of assurance provided by mathematical proof. It should also be understood that such a mixed radix number generator process can be used in a variety of communications system applications. For example, such a mixed radix number generator process can be implemented in a cryptographic system for altering a data stream. In such a scenario, the mixed radix number generator process provides an increased security feature to the cryptographic system. It should be noted that this mixed radix number generator process produces a random number sequence that appears to be highly non-deterministic in nature. In performing the modulo reduction, information from the original number sequence is intentionally destroyed. In effect, unintended reconstruction is made more difficult.

The present invention will now be described more fully hereinafter with reference to accompanying drawings, in which illustrative embodiments of the invention are shown. However, this invention may be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

Figure 2:
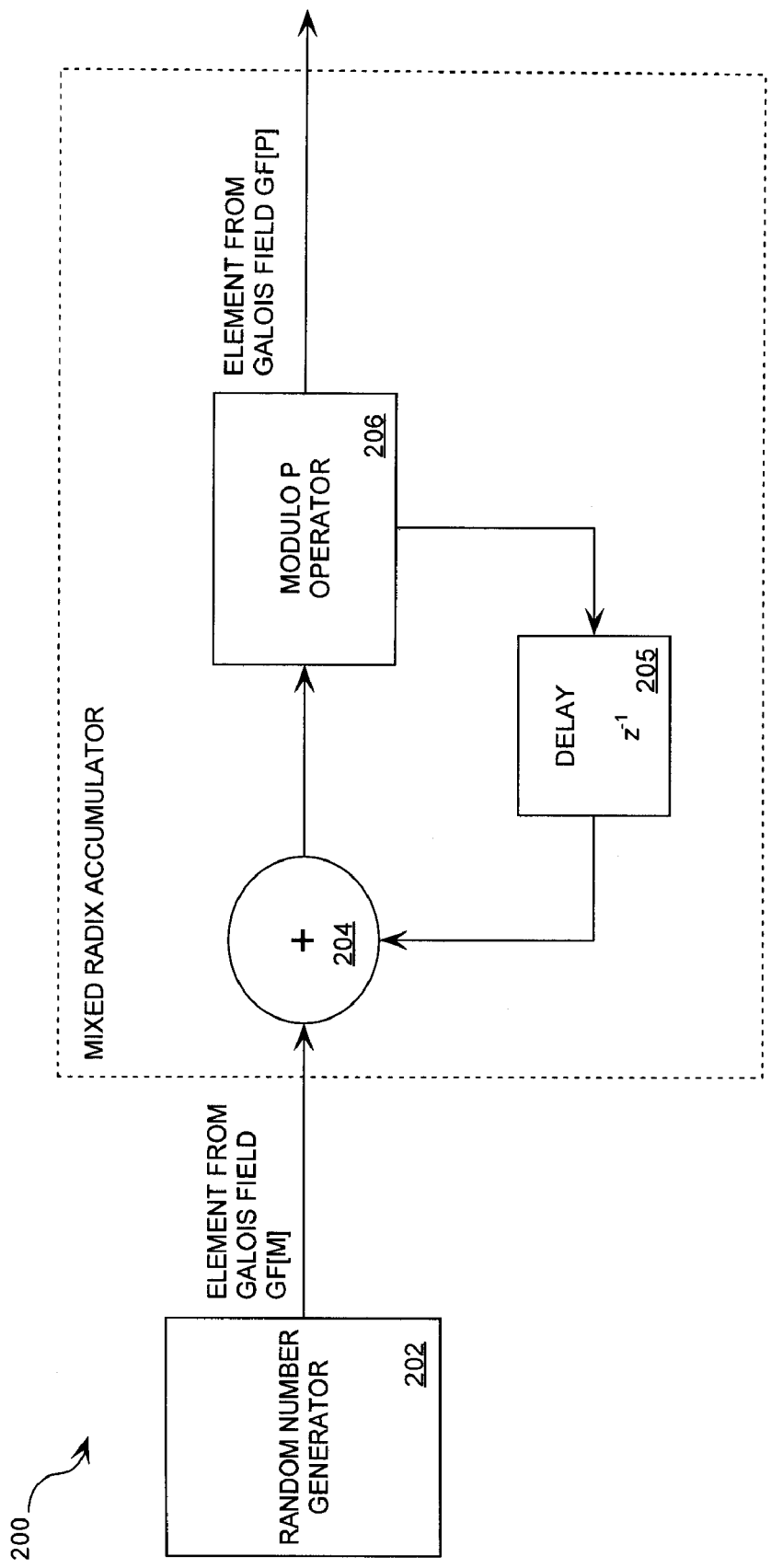
FIG. 2 is a conceptual diagram of a mixed radix ring generator for spreading statistical artifacts evenly over all equivalence classes of a Galois field GF[P].

Referring now to FIG. 2, there is provided a conceptual diagram of a mixed radix number generator structure which is useful for spreading statistical artifacts evenly over all equivalence classes of a Galois field GF[P]. As shown in FIG. 2, the mixed radix ring generator process begins with the generation of random number sequence in random number generator 202. The random number sequence can be, but is not limited to, a pseudo-random number sequence or a pseudo-chaotic sequence generated on a Galois field of characteristic M. Such a sequence is most easily viewed as a sequence of random elements chosen from a Galois field GF[M]. In order to map an element from the Galois field GF[M] to a desired Galois field of characteristic P, the Galois field characteristic M is selected to be relatively prime to the Galois field characteristic P. The phrase "relatively prime" as used herein refers to a collection of numbers having a greatest common divisor of one (1).

The random number sequence is communicated to an adder 204. To negate the statistical anomalies described above (in relation to FIG. 1), a previous output of a modulo P operation is added to a next input from a Galois field GF[M] via a feedback structure. The feedback structure includes a delay unit 205. A result from the adding operation is then communicated to the modulo P operator 206. The modulo P operator 206 performs a modulo P operation on the result from the adding operation to generate an output value. The output of the modulo P operator is then used as the next addition input, effectively rotating the entire ring structure of GF[M]. In effect, the cumulative statistical deviation becomes significantly less noticeable since the rotation will converge to a steady-state value. It is easy to show statistically, that taking numerous such samples from a Galois field GF[P] will distribute the statistical anomalies over all the equivalence classes evenly, returning the output distribution to that of a uniform distribution. An additional option is to induce a constant rotation in addition to that of the feedback path (ideally a value that is less than P and mutually prime with {M, P}) to ensure that there are no fixed points in the conversion. In mathematical parlance, a "fixed point" is one that remains the same both at the input and the output of a mathematical operator, making repeated applications of the operator result in a constant value. For example, zero (0) is a fixed point of the traditional multiplication operator, since every number times zero (0) is zero (0).

A few numerical examples may help in seeing how the conversion works.

EXAMPLE 1

Let M=5*7=35, p=3, and an initial condition value of the unit delay be zero (0). It should be noted that the initial condition (initial output value) of the unit delay can alternatively be any of zero (0), one (1) or two (2). Note that, absent the feedback mechanism described above, the outputs of the modulo P operation is a stream of values that have a statistical artifact within a Galois field GF[P]. If the distribution of the outputs of the random number generation are truly uniform, then the first two (2) equivalence classes of the Galois filed GF[P] will be larger by one (1) element than the third ($3^{rd}$) equivalence class. This is easily seen from the computation of 35 modulo 3=(3*11+2) modulo 3=2 modulo 3. The feedback (i.e., delay) in FIG. 2 spreads this statistical non-uniformity in the Galois field GF[P] about all three (3) of its equivalence classes.

If the outputs of a first random number generation is a stream defined as {23 8 19 31 06 13 21 21 . . . }, then the corresponding output of a modulo three (3) operation without feedback would be [2 2 1 1 0 0 1 0 0 . . . ]. Note that multiple inputs in this case map to the same output, which makes the reverse mapping more difficult. The output of the modulo three (3) operation with unit delay feedback as shown in FIG. 2 is {2 1 2 0 0 0 1 1 1 . . . }. The difference of numbers on this small scale may appear negligible, yet the feedback is spreading the non-uniformity of the mixed-radix conversion about the equivalence classes of GF[P].

Figure 3:
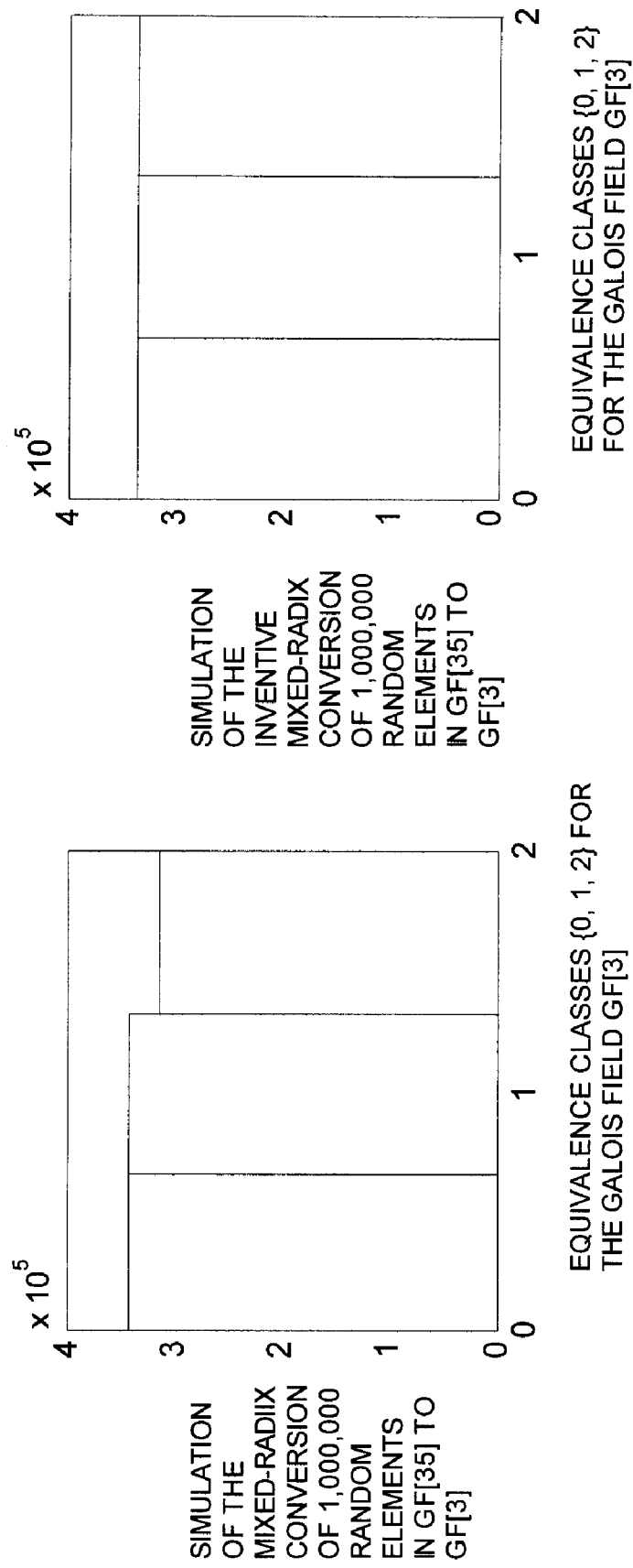
FIG. 3A is a graph showing statistical simulations of a conventional mixed radix conversion algorithm that is useful for understanding the invention.
FIG. 3B is a graph showing statistical simulations of a mixed radix number generator method that is useful for understanding the invention.

In order to fully appreciate the non-uniformity which can exist with more conventional systems, and the improvement obtained with the arrangement described in FIG. 2, consider a scenario in which the random number generator 202 in FIG. 2 generates 1,000,000 randomly chosen outputs from a uniform distribution of GF[M], where M=35. The Galois field GF[P] is selected to be a Galois field GF[3]. The first random number sequence is comprised of one million (1,000,000) randomly drawn elements from the Galois field GF[M]. If the conventional mixed radix conversion algorithm (described above in relation to FIG. 1) is employed, then the mapping operations result in a non-uniform distribution of the elements over the Galois field GF[3]. A graph is provided in FIG. 3A that illustrates the results of these mapping operations as obtained from a MATLAB® simulation. MATLAB® is a common numerical simulation and analysis tool. The graph shows that the elements zero (0) and one (1) appear more frequently in the output as compared to the value two (2). If the mixed radix number generator process (described above in relation to FIG. 2) is employed with a fixed rotation offset of one (1), then the statistical artifacts are spread almost evenly over all equivalence classes of a Galois field GF[3]. A graph is provided in FIG. 3B that illustrates the results of the mixed radix number generator process of FIG. 2 as obtained from a MATLAB® simulation. The graph in FIG. 3B shows a uniform distribution of the elements zero (0), one (1) and two (2) in the output sequence.

Mixed Radix Number Generator Method

Figure 4:
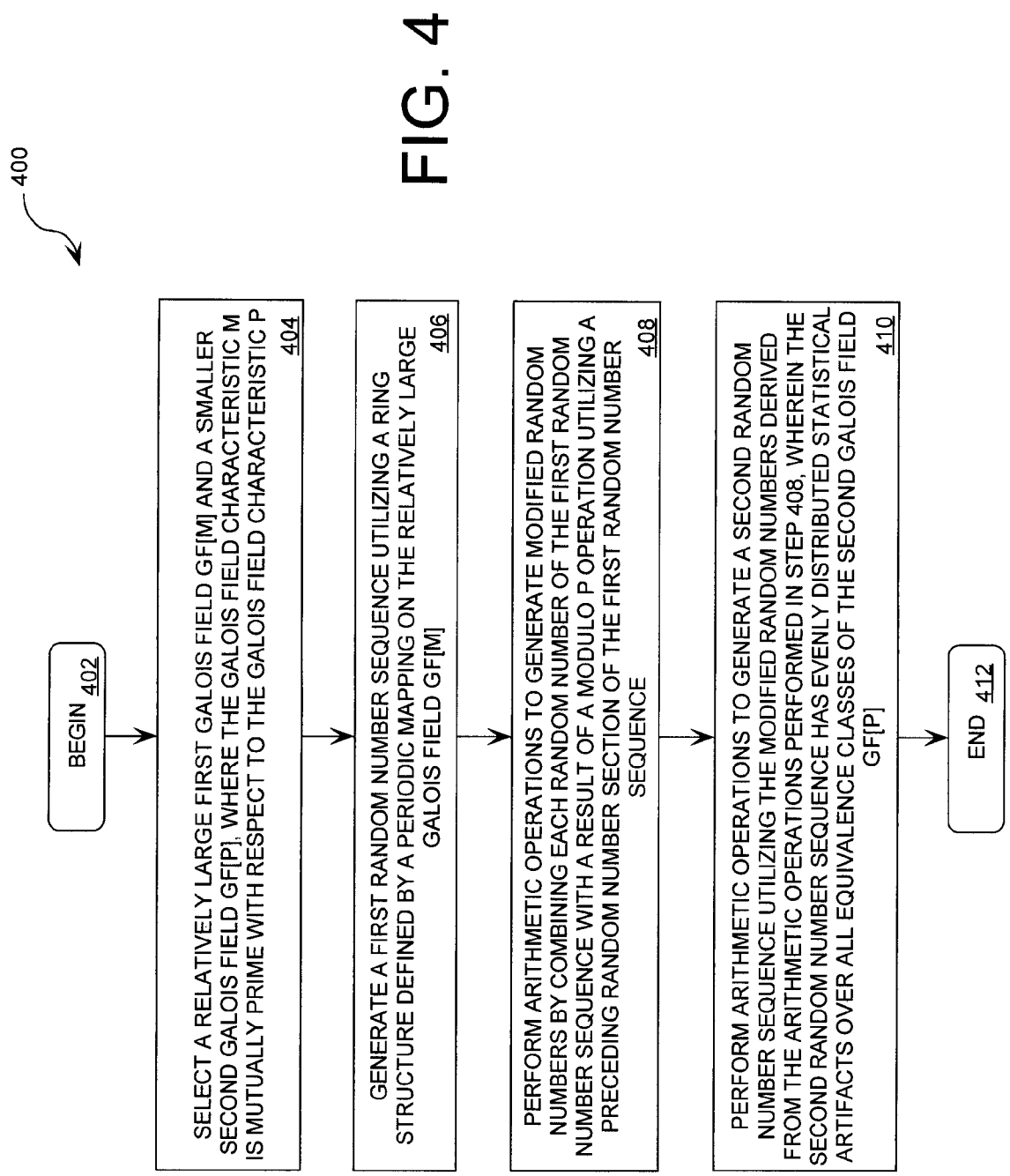
FIG. 4 is a flow diagram of a mixed radix number generator method for spreading statistical artifacts evenly over all equivalence classes of a Galois field GF[P].

Referring now to FIG. 4, there is provided a flow diagram of a mixed radix number generator method 400 for spreading statistical artifacts evenly over all equivalence classes of a Galois field GF[P]. The flow diagram is an alternative expression of the concept which is shown in FIG. 2. As shown in FIG. 4, the method 400 begins with step 402 and continues with step 404. In step 404, a relatively large first Galois field GF[M] is selected. The relative sizes of M and P can take any value and retain the statistical properties described in this application. The value of M is typically chosen to be orders of magnitude larger than P, but that is not a requirement for the embodiment to function correctly. Step 404 also involves selecting a second Galois field GF[P] which is smaller than the first Galois field GF[M]. Step 404 further involves selecting the Galois field characteristic M to be mutually prime with respect to the Galois field characteristic P. The phrase "mutually prime" as used herein refers to two (2) or more integers having no common integer divisor except one (1).

After step 404, the method 400 continues with step 406. In step 406, a first random number sequence is generated utilizing a ring structure defined by the relatively large Galois field GF[M]. Still, the invention is not limited in this regard. For example, the first random number sequence can also be generated utilizing a ring structure defined by a punctured Galois field GF'[M]. As used herein, the term "punctured" means at least one element has been discarded in a Galois field GF[M] that exceed an integer multiple of a desired characteristic.

Referring again to FIG. 4, the first random number sequence includes the random numbers $RN_1, RN_2, \ldots, RN_N$. The random number sequence can be, but is not limited to, a pseudo-random number sequence or a pseudo-chaotic number sequence. In this regard, it should be understood that a random number generator (RNG) can be employed for generating a random number sequence on the relatively large Galois field GF[M] or a punctured Galois field GF'[M]. RNGs are well known to persons skilled in the art, and therefore will not be described in detail herein. However, it should be understood that any RNG known in the art can be used without limitation.

Subsequently, the method 400 continues with step 408. Step 408 and a subsequent step 410 (described below) collectively provide a means for removing unwanted statistical artifacts in a mixed radix conversion. Step 408 and the subsequent step 410 (described below) also collectively provide a means for spreading statistical artifacts evenly over all equivalence classes of a Galois field GF[P]. This even distribution of statistical artifacts provides stochastic adherence to a desired statistical property, namely a uniform distribution of elements from the Galois field GF[M] over the Galois field GF[P]. Further, step 408 and the subsequent step 410 (described below) also collectively provide a means for inducing chosen statistical artifacts over the equivalence classes of a Galois field GF[P].

In step 408, arithmetic operations are performed to combine each random number $RN_1, RN_2, \ldots, RN_N$ of the first random number sequence with a result of a modulo P operation. P is the Galois field characteristic of a Galois field GF[P]. The modulo P operation utilizes a preceding random number $RN_1, RN_2, \ldots, RN_N$ of the first random number sequence. The arithmetic operations can be generally defined by the mathematical Equations (1) through (4).

$$RN_1' = RN_1 + IC \quad (1)$$

$$RN_2' = RN_2 + RN_1' \text{ modulo } P \quad (2)$$

$$RN_3' = RN_3 + RN_2' \text{ modulo } P \quad (3)$$

$$\ldots$$

$$RN_N' = RN_N + RN_{N-1}' \text{ modulo } P \quad (4)$$

where $RN_1'$ is a modified first random number derived from a first arithmetic operation. $RN_2'$ is a modified second random number derived from a second arithmetic operation. $RN_3'$ is a modified third random number derived from a third arithmetic operation. $RN_N'$ is a modified Nth random number derived from an $N^{th}$ arithmetic operation. $RN_{N-1}'$ is a second to last modified random number derived from a second to last arithmetic operation. $RN_1$ is a first random number of the first random number sequence. $RN_2$ is a second random number of the first random number sequence. $RN_3$ is a third random number of the first random number sequence. $RN_N$ is a last random number of the first random number sequence. P is a modulus having a value selected to be a positive integer defining a finite field size of a Galois field GF[P]. IC is an initial condition drawn on GF[P].

An alternative embodiment of step 408 is to combine each random number $RN_1, RN_2, \ldots, RN_N$ of the first random number sequence with a result of a modulo P operation plus a fixed offset. P is the Galois field characteristic of a Galois field GF[P]. The modulo P operation utilizes a preceding random number $RN_1, RN_2, \ldots, RN_N$ of the first random number sequence. The arithmetic operations can be generally defined by the mathematical Equations (5) through (8).

$$RN_1' = RN_1 + C + IC \text{ modulo } P \quad (5)$$

$$RN_2' = RN_2 + RN_1' + C \text{ modulo } P \quad (6)$$

$$RN_3' = RN_3 + RN_2' + C \text{ modulo } P \quad (7)$$

$$\ldots$$

$$RN_N' = RN_N + RN_{N-1}' + C \text{ modulo } P \quad (8)$$

where $RN_1'$ is a modified first random number derived from a first arithmetic operation. $RN_2'$ is a modified second random number derived from a second arithmetic operation. $RN_3'$ is a modified third random number derived from a third arithmetic operation. $RN_N'$ is a modified $N^{th}$ random number derived from an $N^{th}$ arithmetic operation. $RN_{N-1}'$ is a second to last modified random number derived from a second to last arithmetic operation. $RN_1$ is a first random number of the first random number sequence. $RN_2$ is a second random number of the first random number sequence. $RN_3$ is a third random number of the first random number sequence. $RN_N$ is a last random number of the first random number sequence. P is a modulus having a value selected to be a positive integer defining a finite field size of a Galois field GF[P]. IC is an initial condition drawn on GF[P]. C is a constant chosen to rotate the effective output in a manner to eliminate any fixed points.

After step 408, the method 400 continues with step 410. It should be understood that step 410 is performed to generate a second random number sequence. This second random number sequence has evenly distributed statistical artifacts over all equivalence classes of the second Galois field GF[P]. Step 410 involves performing arithmetic operations utilizing the modified random numbers $RN_1', RN_2', RN_3', \ldots, RN_N'$ derived from the arithmetic operations performed in step 408.

These arithmetic operations can be defined by the mathematical Equations (9) through (12).

$$R_1 = RN_1' \text{ modulo } P \quad (9)$$

$$R_2 = RN_2' \text{ modulo } P \quad (10)$$

$$R_3 = RN_3' \text{ modulo } P \quad (11)$$

$$\ldots$$

$$R_3 = RN_{N-1}' \text{ modulo } P \quad (12)$$

where $R_1$ is a result derived from a first arithmetic operation. $R_2$ is a result derived from a second arithmetic operation. $R_3$ is a result derived from a third arithmetic operation. $R_N$ is a result derived from a last arithmetic operation. $RN_1'$ is a modified first random number derived from a first arithmetic operation performed in step 408. $RN_2'$ is a modified second random number derived from a second arithmetic operation performed in step 408. $RN_3'$ is a modified third random number derived from a third arithmetic operation performed in step 408. $RN_N'$ is a modified $N^{th}$ random number derived from an $N^{th}$ arithmetic operation performed in step 408. P is a modulus having a value selected to be a positive integer defining a finite field size of a Galois field GF[P]. It should be understood that each of the results $R_1, R_2, \ldots, R_N$ is an element $\{0, 1, 2, \ldots, P-1\}$ from the Galois field GF[P]. It should be understood that the second random number sequence is defined by a set of random numbers, namely $R_1, R_2, \ldots, R_N$.

Referring again to FIG. 4, the method 400 continues with step 412. In step 412, the method 400 ends. It should be understood that the method 400 is one method for removing unwanted statistical artifacts in a conventional mixed radix conversion. However, the invention is not limited in this regard and any other mixed radix number generator method configured for spreading statistical artifacts evenly over all equivalence classes of a Galois field GF[P] can be used without limitation.

Method for Altering a Data Stream

Figure 5:
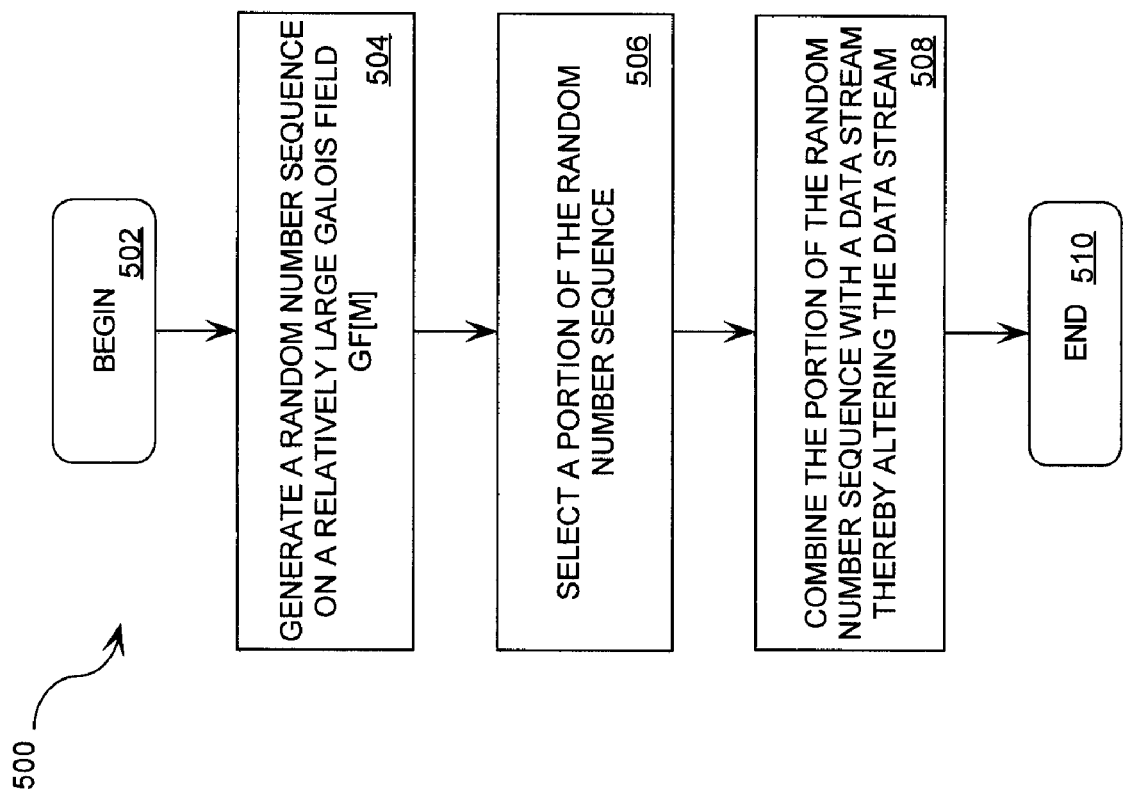
FIG. 5 is a flow diagram of a conventional method for altering a data stream that is useful for understanding the invention.

Referring now to FIG. 5, there is provided a flow diagram of a conventional method 500 for altering a data stream that is useful for understanding the invention. As shown in FIG. 5, the method 500 begins with step 502 and continues with step 504. In step 504, a random number sequence is generated. It should be understood that the sequence of random numbers are contained within a relatively large Galois field GF[M]. After generating the random number sequence, step 506 is performed where a portion of the random number sequence is selected.

After step 506, the method 500 continues with step 508. In step 508, the portion of the random number sequence is combined with the input data stream thereby altering the input data stream. In this regard, it should be understood that the portion of the random number sequence has a size that is greater than or equal to that of the input data stream, i.e., when they are expressed in the same number base (or radix). As such, the method 500 can be modified accordingly. For example, the method 500 can include a conversion step prior to the step 508. The conversion step can involve converting the portion of the random number sequence from a size GF[M] to a size n if the input data stream is of a size GF[n] or GF[n/d], where d is an even divisor of n. Subsequently, step 510 is performed where the method 500 ends.

As should be understood, a relatively large Galois field GF[M] provides a certain degree of security to the conventional method 500. In this regard, it should be appreciated that the Galois field GF[M] is a field that contains only a finite number of elements $\{0, 1, 2, \ldots, M-1\}$. The Galois field GF[M] has a finite field size defined by the Galois characteristic M. As such, an output sequence can repeat every $M_{th}$ element. This repetitive behavior can produce correlations thereby making a decoding of an altered data stream relatively easy when M is small. Consequently, it is desirable to select a relatively large Galois field GF[M].

It should also be appreciated that selecting a portion of the random number sequence also provides a certain degree of security to the conventional method 500. For example, a random number sequence is generated on a Galois field GF[M]. As an example, assume that the random number sequence contains five hundred (500) bits. If a portion of the random number sequence is selected to include only sixteen (16) of the five hundred (500) bits to alter a data stream, then it becomes more difficult to determine the Galois field GF[M] employed for generating the random number sequence. Still, it is desirable to further increase the security of the method.

Figure 6:
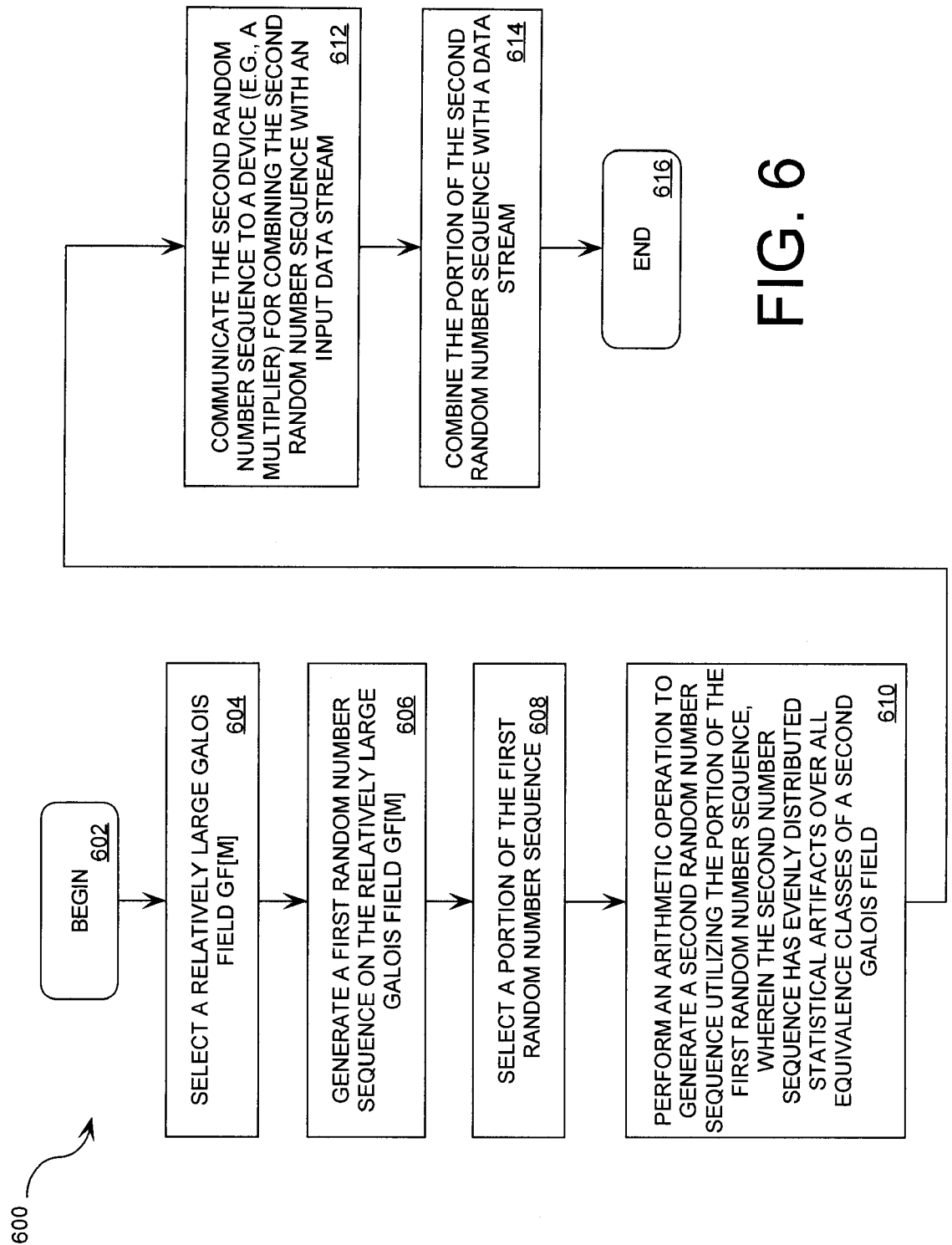
FIG. 6 is a flow diagram of a method for increasing the security of a communications system that is useful for understanding the invention.

Referring now to FIG. 6, there is provided a method 600 for increasing a security of a cryptographic system. As shown in FIG. 6, the method 600 begins with step 602 and continues with step 604. In step 604, a relatively large Galois field GF[M] is selected. As should be understood, a large Galois field can minimize the likelihood that an attacker of a cryptographic system can determine the Galois field GF[M] or any associated mapping employed for generating an original random number sequence from an altered data stream. The associated mapping can include, but is not limited to, the selection of an initial condition (IC) for mathematical Equation (5), a permutation-based mapping of elements within the Galois field, or a time-dependant change in the statistics or radix of the underlying arithmetic. In effect, the large Galois field GF[M] can provide a certain degree of security to a cryptographic system implementing the method 600. Stated in an alternate fashion, the security of a random number sequence is largely defined by the dynamic range of the output value (number of bits or digits) and the apparent randomness.

Thereafter, step 606 is performed where a first random number sequence is generated utilizing a ring structure defined by the Galois field GF[M]. Still, the invention is not limited in this regard. For example, the first random number sequence can also be generated utilizing a ring structure defined by a punctured Galois field GF' [M]. Each random number of the sequence is defined by an element of the Galois field GF[M] or the punctured Galois field GF' [M]. In step 608, a portion of the first random number sequence is selected. This step provides a higher degree of security to a cryptographic system implementing method 600. In this regard, it should be appreciated that it becomes more difficult to determine the Galois field GF[M] when only a portion of the random number sequence is used to alter an input data stream.

Step 610 also involves performing arithmetic operations to generate a second random number sequence. This second random number sequence has statistical artifacts evenly distributed over all equivalence classes of the second Galois field GF[P]. According to a preferred embodiment of the invention, these arithmetic operations can be the mixed radix number generator process described above in relation to FIG. 2. Still, it should be appreciated that the invention is not limited in this regard. Any other suitable technique can be used for this purpose.

Referring again to FIG. 6, the method 600 continues with step 612. In step 612, the second random number sequence is communicated to a device, such as a multiplier. The second random number sequence is combined with an input data stream to form an altered data stream. The input data stream is of a size GF(n) or GF(n/d), where d is an even divisor of n. In this regard, it should be understood that the second random number sequence and the input data stream have the same size, i.e., they are expressed in the same number base (or radix) and contain the same number of digits. Thereafter, step 616 is performed where the method 600 ends.

A person skilled in the art will appreciate that method 600 is one method for increasing a security of a cryptographic system. However, the invention is not limited in this regard and any other method implementing the present invention can be used without limitation.

Hardware Implementations

There are a variety of ways to implement the method 400 (described above in relation to FIG. 4) for removing unwanted statistical artifacts in a conventional mixed radix conversion algorithm. For example, the mixed radix number generator method 400 can be implemented utilizing a mixed radix accumulator arrangement similar to the one shown in FIG. 2. The mixed radix number generator can be deployed in a cryptographic system for altering a data stream. In such a scenario, the mixed radix number generator can provide an increased security feature to the cryptographic system. Such a mixed radix number generator is described below in relation to FIG. 7.

Figure 7:
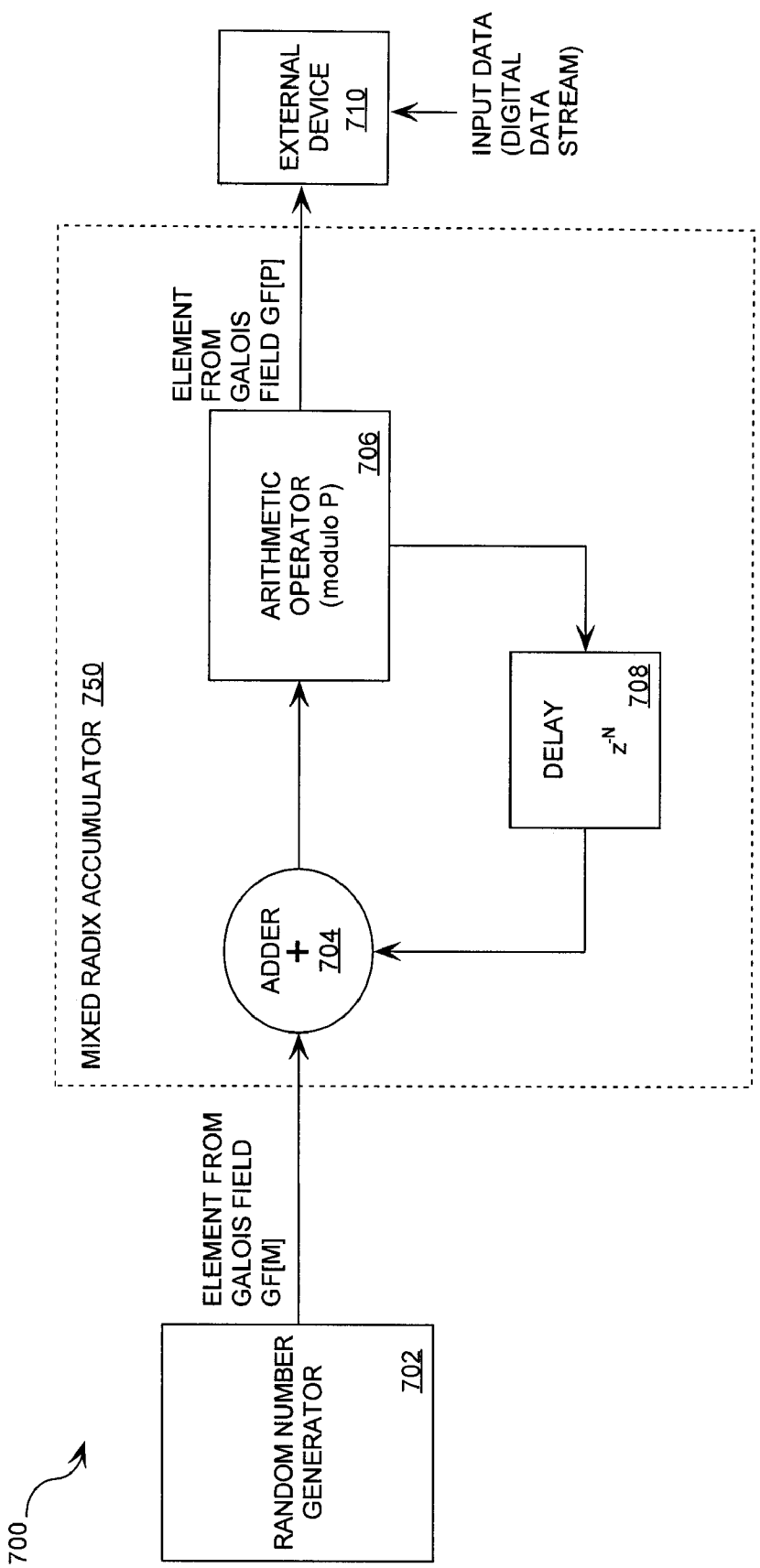
FIG. 7 is a block diagram of a mixed radix number generator connected to a mechanism for combining a generator output with a data steam that is useful for understanding the invention.

Referring now to FIG. 7, there is provided a block diagram of a mixed radix number generator 700. The mixed radix number generator 700 is comprised of a random number generator 702, a mixed radix accumulator 750, and an external device 710. The random number generator 702 can be, but is not limited to, a ring generator, a punctured ring generator, or a chaos generator. If the random number generator 702 is a ring generator, then the random number generator 702 is comprised of hardware and/or software configured to generate a random number sequence utilizing an algebraic structure defined by a Galois field GF[M]. If the random number generator is a punctured ring generator, then the random number generator 702 is comprised of hardware and/or software configured to generate a random number sequence utilizing a ring structure defined by a punctured Galois field GF' [M]. Accordingly, the output of the random number generator 702 can be a random element from the Galois field GF[M] or a random element from the punctured Galois field GF' [M]. In order to map an element from the Galois field GF[M] or the punctured Galois field GF' [M] to a desired Galois field characteristic P, the Galois field characteristic M is selected to be relatively prime to the Galois field characteristic P. Also, the Galois field characteristic M is selected to be greater than the Galois field characteristic P.

The random number generator 702 is also comprised of hardware and/or software configured to communicate a random number of a random number sequence to the mixed radix accumulator 750. The mixed radix accumulator 750 is configured to perform an arithmetic operation to generate a second random number. The arithmetic operation involves computing a remainder value utilizing the random number received from the random number generator 702. Accordingly, the mixed radix accumulator 750 is comprised of an adder 704, an arithmetic operator 706 and a delay 708.

The adder 704 is comprised of hardware and/or software configured to receive a random number from the random number generator 702 and a time delayed remainder from the delay 708 (described below). The adder 704 is also comprised of hardware and/or software configured to perform an addition operation using the random number received from the random number generator 702 and the time delayed remainder received from the delay 708 (described below). The adder 704 is also comprised of hardware and/or software configured to communicate the sum of the addition operation to the arithmetic operator 706.

The arithmetic operator 706 is comprised of hardware and/or software configured to perform arithmetic operations. The arithmetic operations can involve performing modulo operations. Modulo operations are well known to those skilled in the art, and therefore will not be described in detail herein. However, it should be appreciated that modulo operations can generally be defined by a mathematical equation: R=S modulo P, where R is a remainder derived from a modulo operation. S is a random number input to the arithmetic operator 706. P is a modulus having a value selected to be a positive integer defining a finite field size of a Galois field GF[P]. It should be understood that the remainder R is an element from the Galois field GF[P].

The arithmetic operator 706 is further comprised of hardware and/or software configured to communicate the remainder R to the external device 710 and the delay 708. The external device 710 can be a combiner configured for combing the remainder with input data or a digital data stream. For example, the external device is a multiplier in one embodiment of the invention. The delay 708 is comprised of hardware and software configured to delay the remainder R received from the arithmetic operator 706 by $z^{-N}$ or N clock cycles, where $z^{-1}$ is a one (1) sample clock period delay or unit delay and N is a positive integer value. $z^{-N}$ is an N clock period delay. For example, the delay 708 is configured to delay the remainder R by one (1) clock cycle. Still, the invention is not limited in this regard.

A person skilled in the art will appreciate that the mixed radix generator 700 is one architecture of a mixed radix generator implementing the present invention. However, the invention is not limited in this regard and any other mixed radix generator architecture implementing the present invention can be used without limitation.

It should be understood that the method and system for a mixed radix number generator described in relation to FIGS. 1-7 is not limited with regard to the size or composition of the number P. For example, P can be selected so that P is equal to the product of $p_1 \cdot p_2 \cdot, \ldots, p_k$, where all of the k factors are mutually prime with respect to M and each other. This characteristic of the system can facilitate certain alternative embodiments which provide for k individual outputs, each of which can offer similar statistical behavior as compared to the system described above in reference to FIGS. 1-7. Such a mixed radix generator is provided in FIG. 8.

A Mixed Radix Accumulator with Multiple Outputs

Figure 8:
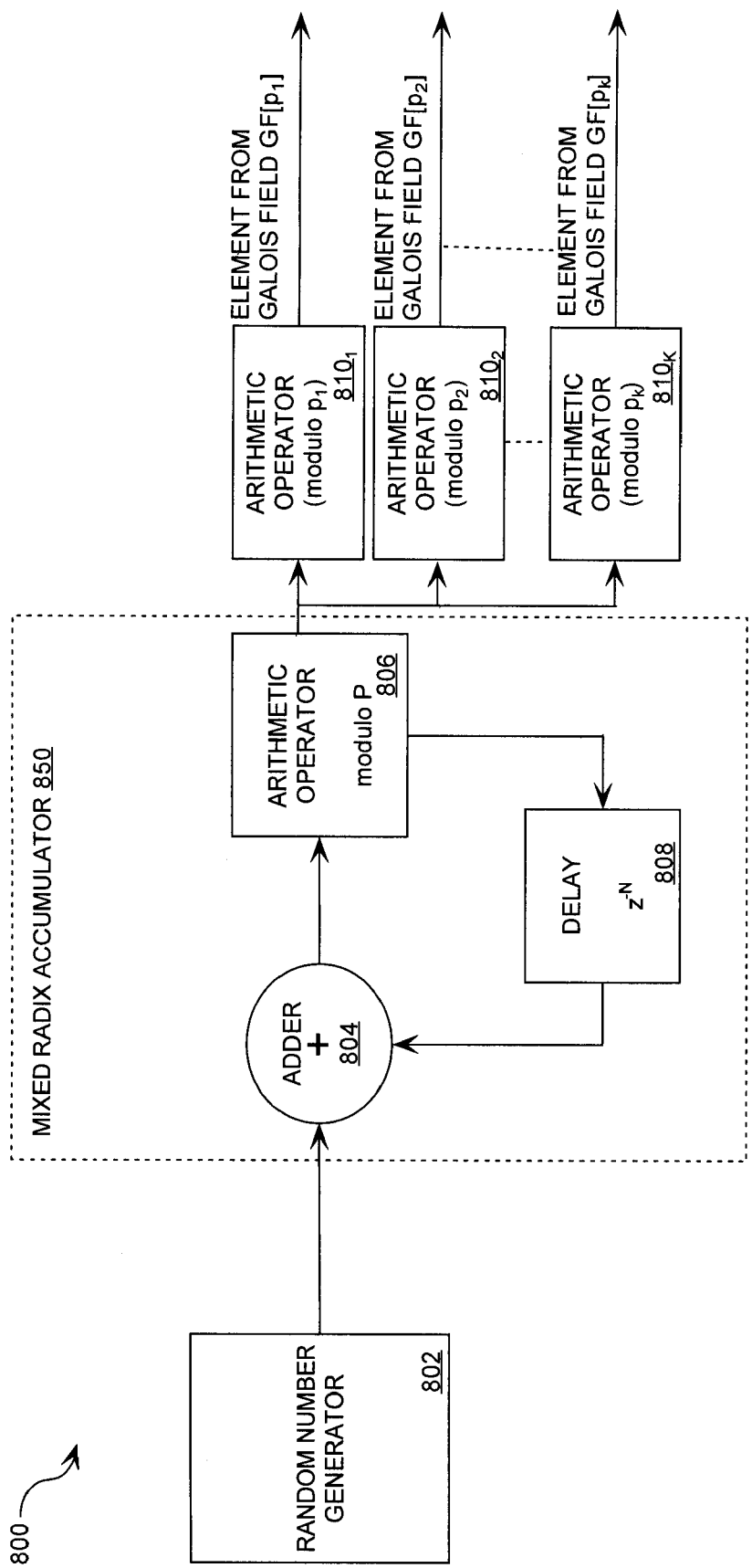
FIG. 8 is a block diagram of a mixed radix number generator that is useful for understanding the invention.

Referring now to FIG. 8, there is provided a block diagram of an alternative embodiment of a mixed radix number generator 800 which provides multiple outputs. The mixed radix number generator 800 is comprised of a random number generator 802 and a mixed radix accumulator 850. The random number generator 802 can be, but is not limited to, a ring generator, a punctured ring generator, or a chaos generator. If the random number generator 802 is a ring generator, then the random number generator 802 is comprised of hardware and/or software configured to generate a random number sequence utilizing an algebraic structure defined by a Galois field GF[M]. If the random number generator is a punctured ring generator, then the random number generator 802 is comprised of hardware and/or software configured to generate a random number sequence utilizing a ring structure defined by a punctured Galois field GF' [M]. Accordingly, the output of the random number generator 802 can be a random element from a Galois field GF[M] or a random element from a punctured Galois field GF' [M].

In order to map an element from the Galois field GF[M] or the punctured Galois field GF' [M] to a desired Galois field characteristic P, the Galois field characteristic M is selected to be relatively prime to the Galois field characteristic P, where P is equal to the product of $p_1 \cdot p_2 \cdot, \ldots, \cdot p_k$. The Galois field characteristic M is also selected to be mutually prime with the factors $p_1, p_2, \ldots p_k$ of the Galois field characteristic P. The Galois field characteristic M is further selected to be greater than the Galois field characteristic P.

The random number generator 802 is also comprised of hardware and/or software configured to communicate random numbers of a random number sequence to the mixed radix accumulator 850. The mixed radix accumulator 850 advantageously has a configuration which is similar to the mixed radix accumulator 750 and performs similar functions. In this regard, the mixed radix accumulator is configured to perform an arithmetic operation to generate a second random number. The arithmetic operation involves computing a remainder value utilizing the random number received from the random number generator 802. Accordingly, the mixed radix accumulator 850 is also comprised of an adder 804, an arithmetic operator 806, and a delay 808.

The random number generator 802 also includes a plurality of arithmetic operators $810_1, 810_2, \ldots, 810_k$. Each of the arithmetic operators $810_1, 810_2, \ldots, 810_k$ is comprised of hardware and/or software configured to perform arithmetic operations. The arithmetic operations can involve performing modulo operations. According to a preferred embodiment, the modulo operations are defined by the mathematical equation R modulo p, where R is a remainder derived from a modulo operation performed at the arithmetic operator 806, and p is one of the factors $p_1, p_2, \ldots, p_k$ of the Galois field characteristic P. Each of the arithmetic operators $810_1, 810_2, \ldots, 810_k$ is also_comprised of hardware and/or software configured to produce one of k outputs. Each of the arithmetic operators $810_1, 810_2, \ldots, 810_k$ provides as an output an element of a Galois field $GF[p_1]$ through $GF[p_k]$ whose collective combination is isomorphic to GF[P] and which can be forwarded to an external device (not shown). The external device can be any device configured for combing the remainder with input data. For example, in one embodiment the external device is a multiplier. Most significantly, each sequence provided as one of the k outputs from arithmetic operators $810_1, 810_2, \ldots, 810_k$ will have uniformly distributed outputs which are free of unwanted statistical artifacts.

A person skilled in the art will appreciate that the mixed radix generator 800 is one architecture of a mixed radix number generator implementing the present invention. However, the invention is not limited in this regard and any other mixed radix generator architecture implementing the present invention can be used without limitation. According to one such embodiment, the delay 808 can be replaced with a finite impulse response (FIR) or an infinite impulse response (IIR) filter, where all operations are performed using modified Galois Field (GF) arithmetic.

Multi-rate Implementation of Mixed Radix Number Generator

Figure 9:
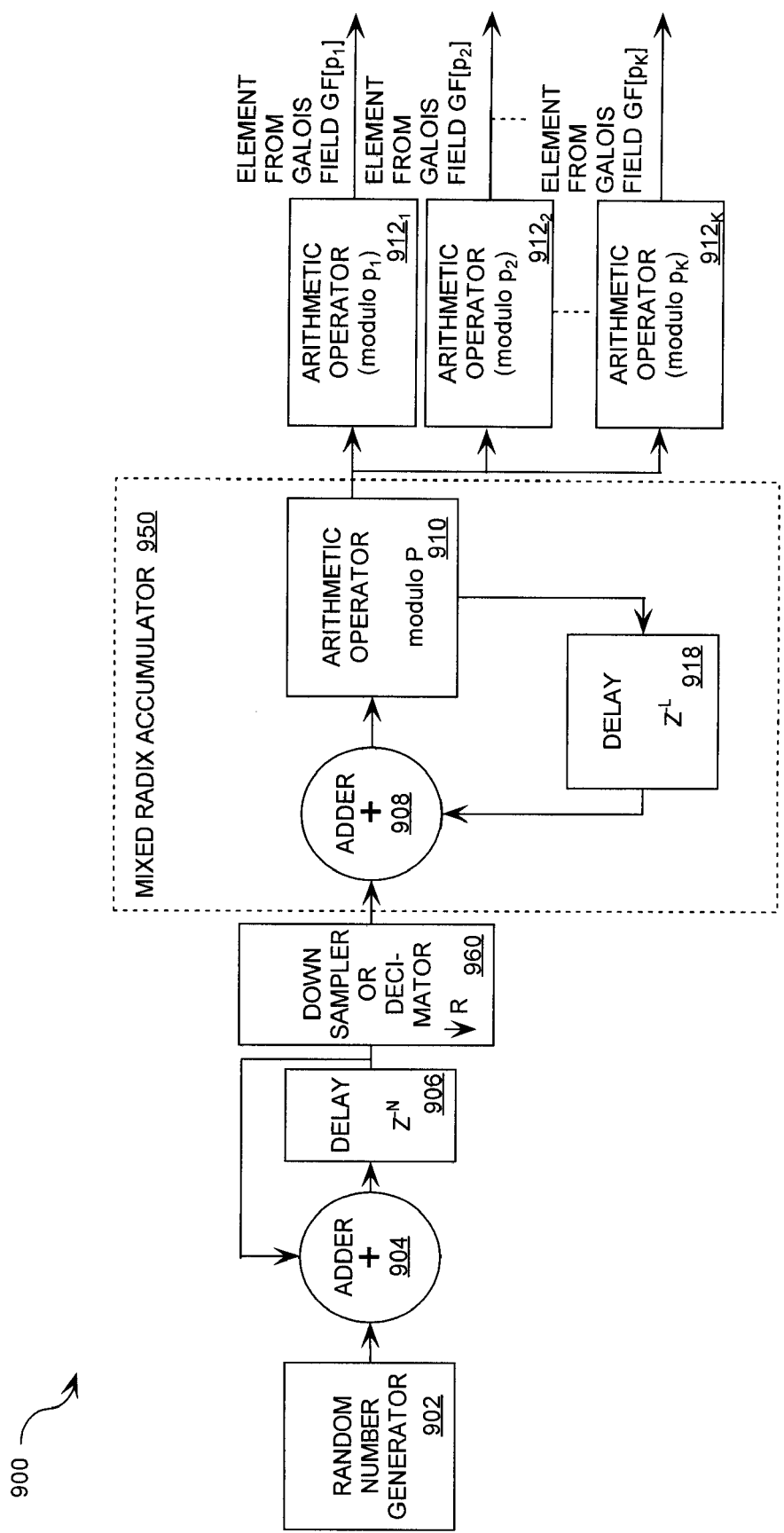
FIG. 9 is a block diagram of a mixed radix number generator that is useful for understanding the invention.

Referring now to FIG. 9, there is provided a second alternative embodiment of the invention. The second alternative embodiment is a multi-rate implementation of a mixed radix number generator 900. The multi-rate implementation can involve either periodically sampling the output from a random number generator or sampling such output at a higher rate as compared to the set of desired outputs. Once again, this leads to an accumulation of values that cannot easily be reconstructed by an observer.

As illustrated in FIG. 9, the mixed radix generator 900 is comprised of a random number generator 902 and a mixed radix accumulator 950. The random number generator 902 and the mixed radix accumulator 950 are similar to the corresponding structures 802, 850 described above in relation to FIG. 8. Accordingly, the mixed radix accumulator 950 can also be comprised of an adder 908, an arithmetic operator 910, and a delay 918. A set of arithmetic operator units $912_1, 912_2, \ldots, 912_k$ can also be provided for performing operations similar to those arithmetic operator units $810_1, 810_2, \ldots, 810_k$ in FIG. 8. Multi-rate processing is well understood by those skilled in the art, and therefore will not be described in detail herein.

The mixed radix generator 900 also includes an adder 904, a delay 906 and a rate changer 960. The adder 904 is comprised of hardware and/or software configured to receive a random number from the random number generator 902 and a time delayed output from the delay 906 (described below). The adder 904 is also comprised of hardware and/or software configured to perform an addition operation using the random number received from the random number generator 902 and the time delayed output received from the delay 906. The adder 904 is also comprised of hardware and/or software configured to communicate the sum of the addition operation to the delay 906.

The delay 906 is comprised of hardware and software configured to delay the sum received from the adder 904 by N clock cycles. Still, the invention is not limited in this regard. The delay 906 is also comprised of hardware an software configured to communicate a time delayed output (i.e., a time delayed sum) to the adders 904 and rate changer 960. The rate changer 960 can be configured to perform down sampling operations and/or decimation operations. Down sampling and decimation operations are well known to those skilled in the art, and therefore will not be described in great detail herein.

A person skilled in the art will appreciate that the mixed radix generator 900 is one architecture of a mixed radix generator implementing the present invention. However, the invention is not limited in this regard and any other mixed radix generator architecture implementing the present invention can be used without limitation.

Cryptographic System

Figure 10:
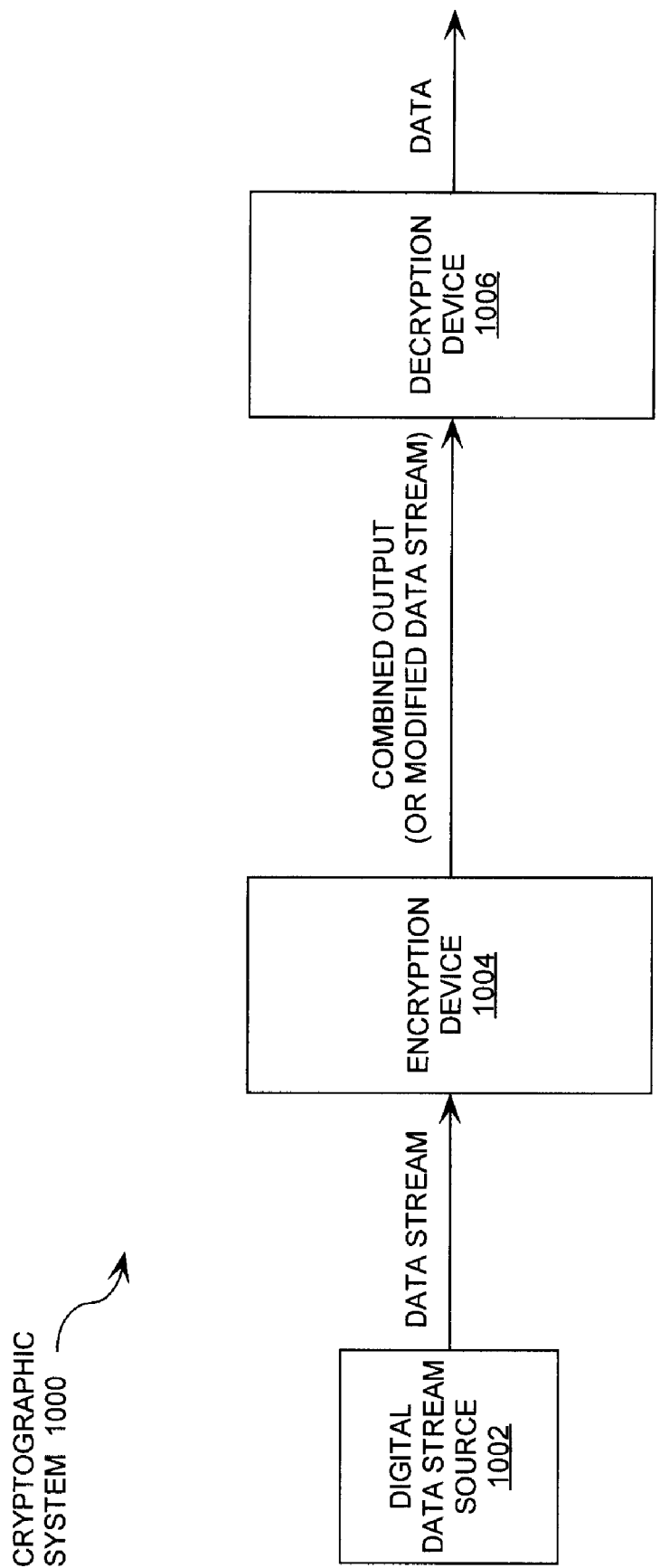
FIG. 10 is a block diagram of a cryptographic system that is useful for understanding the invention.

Referring now to FIG. 10, there is illustrated one embodiment of a cryptographic system 1000 which could be used to implement the inventive arrangements. The cryptographic system 1000 is comprised of a data stream source 1002, an encryption device 1004 and a decryption device 1006. The data stream source 1002 can be comprised of hardware and/or software configured to generate a data stream. The data stream can include payload data, such as voice data, video data, user identification data, signature data and/or the like. The data stream can also be a digital data stream. The data stream source 1002 is also comprised of hardware and/or software configured to communicate the data stream to the encryption device 1004.

The encryption device 1004 is comprised of hardware and/or software configured to generate an encryption sequence. The encryption sequence is a random number sequence having chosen statistical artifacts over all equivalence classes of a Galois Field GF[P]. The encryption device 1004 is also comprised of hardware and/or software configured to perform actions to encrypt (or modify) the data stream using the encryption sequence. The encryption device 1004 is further comprised of hardware and/or software configured to communicate the modified data stream to the decryption device 1006. The encryption device 1004 will be described in greater detail below in relation to FIG. 11.

The decryption device 1006 is comprised of hardware and/or software configured to generate a decryption sequence. The decryption sequence is a random number sequence having chosen statistical artifacts over all equivalence classes of a Galois Field GF[P]. Depending on the characteristics of the primes used in the mixed radix conversion, the decryption sequence can be the same as the encryption sequence generated by the encryption device 1004. Otherwise, the decryption sequence is chosen in a complementary fashion based on the combination method between the encryption sequence and the data stream. The decryption device 1006 is also comprised of hardware and/or software configured to perform actions to decrypt the received modified data stream. Such decryption actions are well known to persons skilled in the art, and therefore will not be described in detail herein. The decryption device 1006 is also comprised of hardware and/or software configured to communicate the decrypted data to an external device (not shown). The decryption device 1006 will be described in greater detail below in relation to FIG. 12.

Figure 11:
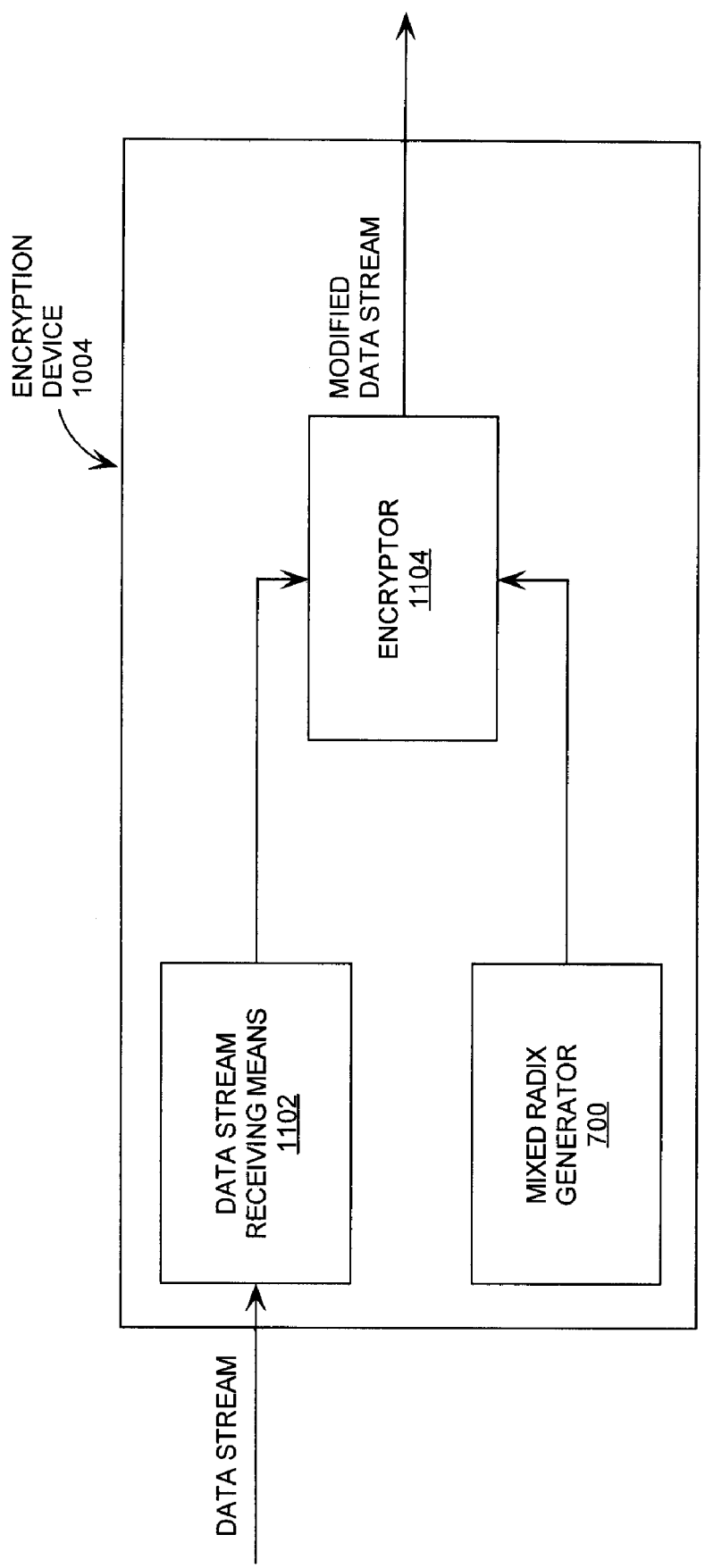
FIG. 11 is a block diagram of the encryptor of FIG. 10 that is useful for understanding the invention.

Referring now to FIG. 11, there is provided a block diagram of the encryption device 1004 of FIG. 10. As shown in FIG. 11, the encryption device 1004 is comprised of a data stream receiving means (DSRM) 1102, a mixed radix generator 700 and an encryptor 1104. Each of the listed components 1100, 1104 is well known to those skilled in the art, and therefore will not be described in detail herein. However, a brief discussion of the encryption device 1004 is provided to assist a reader in understanding the present invention.

Referring again to FIG. 11, the DSRM 1102 is configured to receive a data stream from an external device (not shown). The DSRM 1102 is also configured to communicate the data stream to the encryptor 1104. In this regard, it should be appreciated that the DSRM 1102 is electronically connected to the encryptor 1104.

The mixed radix generator 700 is generally configured to generate an encryption sequence. The encryption sequence is a random number sequence having chosen statistical artifacts over all equivalence classes of a Galois Field GF[P]. The discussion provided above in relation to FIG. 7 is sufficient for understanding the mixed radix generator 700. The mixed radix generator 700 is also configured to communicate the encryption sequence to the encryptor 1104. In this regard, it should be appreciated that the mixed radix generator 700 is electronically connected to the encryptor 1104.

The encryptor 1104 is configured to generate a modified data stream by incorporating or combining the encryption sequence with the data stream. More particularly, the encryptor 1104 is configured to perform a combination method for masking the data stream. The combination method may be a standard multiplication, multiplication on a Galois extension field, addition modulo q, subtraction modulo q, bitwise logic operations or any other standard combination method. In this regard, it should be appreciated that the encryptor 1104 can include a multiplier, an adder, a digital logic device, a feedback mechanism or a similar combining function device.

A person skilled in the art will appreciate that the encryption device 1004 illustrates an exemplary architecture of an encryption device implementing the present invention. However, the invention is not limited in this regard and any other encryption device architecture can be used without limitation. For example, the mixed radix generator 700 can alternatively be a mixed radix generator similar to that shown in FIGS. 8-9.

Figure 12:
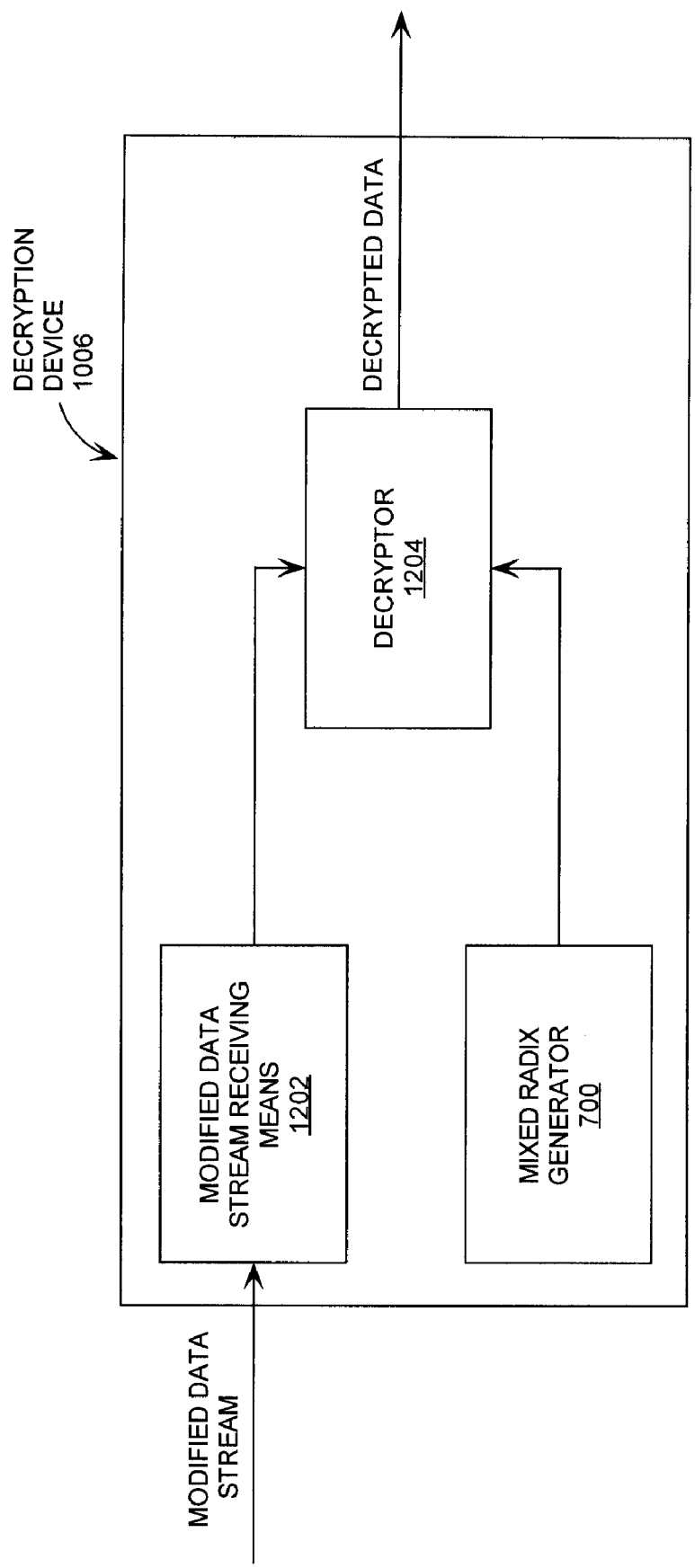
FIG. 12 is a block diagram of the decryptor of FIG. 10 that is useful for understanding the invention.

Referring now to FIG. 12, there is illustrated one embodiment of the decryption device 1006 of FIG. 10. The decryption device 1006 is comprised of a modified data stream receiving means (MDSRM) 1202, a ring generator 700 and a decryptor 1204. Each of the listed components 1202, 1204 is well known to persons skilled in the art, and therefore will not be described in detail herein. However, a brief description of the decryption device 1006 is provided to assist a reader in understanding the invention.

Referring again to FIG. 12, the MDSRM 1202 is comprised of hardware and/or software configured to receive a modified data stream from an external device, such as the encryption device 1004 (described above in relation to FIG. 10). The MDSRM 1202 is also comprised of hardware and/or software configured to communicate the modified data stream to the decryptor 1204. In this regard, it should be appreciated that the MDSRM 1202 is electronically connected to the decryptor 1204.

The mixed radix generator 700 is generally configured to generate a decryption sequence. The decryption sequence is a random number sequence chosen based on the encryption sequence and combination methods. The discussion provided above in relation to FIG. 7 is sufficient for understanding the mixed radix generator 700. The mixed radix generator 700 is also configured to communicate the decryption sequence to the decryptor 1204. In this regard, it should be appreciated that the mixed radix generator 700 is electronically connected to the decryptor 1204. The decryptor 1204 is configured to generate decrypted data by performing a decryption method utilizing the modified data stream and decryption sequence. Decryption methods are well known to persons skilled in the art, and therefore will not be described in detail herein.

A person skilled in the art will appreciate that the decryption device 1006 illustrates an exemplary architecture of a decryption device implementing the present invention. However, the invention is not limited in this regard and any other decryption device architecture can be used without limitation.

A Correlation-Based Cryptographic System Implementation

The present invention provides for an encryption method whereby information is required to decrypt an encrypted (or modified) data stream. The information is a function of an internally generated random number sequence and statistical signal processing. By taking plaintext with a known non-uniform probability distribution and using the same as an input to a mixed radix accumulator, the data transmitted may be compressed to further make reconstruction by an unintended party more difficult. The term "compressed" as used in present context means that an input data stream is truncated modulo a pre-defined radix, reducing the dynamic range of the data representation. The selection of the prime number used in a feedback loop of the mixed radix accumulator may be implemented as a deterministic function of time to obscure the characters of an input data stream. The deterministic function of time is determined by an independent random number sequence.

The present invention can also provide for a decryption method implementing a Hidden Markov Model (HMM) or other similar correlation-based mathematical structure. HMMs are well known to persons skilled in the art, and therefore will not be described in detail herein. However, it should be understood that HMMs can be used to construct sequences of decisions based on data that is partially ambiguous. For example, if one is processing English language text, the letter "q" is encountered, and there is some ambiguity with respect to whether the next letter in the sequence is a "d", "j", or "u", then the HMM in English would indicate that the next letter is "u".

In the present context, an encryption means of inputting a data stream of a dynamic range M into a mixed radix accumulator of characteristic P provides intentional destruction of the plaintext that can be only probabilistically recovered during a decryption process. If the statistical distribution of the plaintext is known at an encryption and decryption device, then an HMM (or other correlation-based mathematical structure) can be used to probabilistically reconstruct the original plaintext from the ciphertext.

Figure 13:
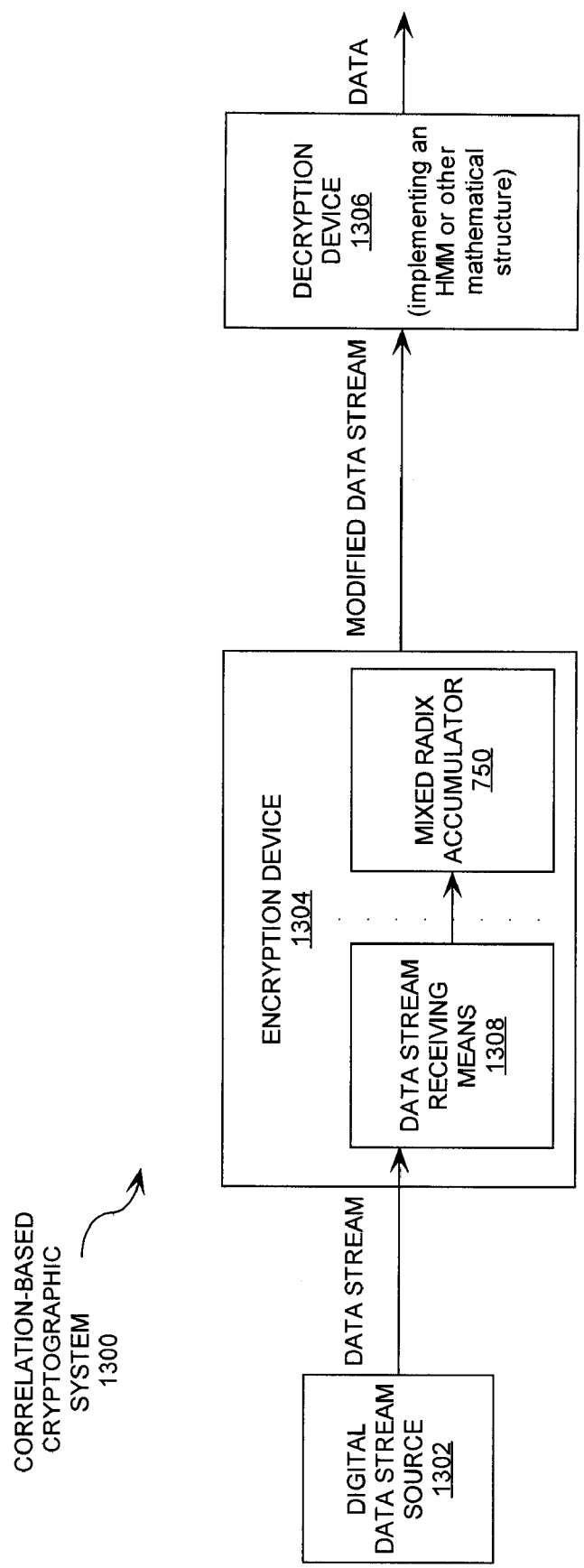
FIG. 13 is a block diagram of a correlation-based cryptographic system that is useful for understanding the present invention.

Referring now to FIG. 13, there is illustrated one embodiment of a correlation-based cryptographic system 1300 which could be used to implement the above described inventive arrangements. As shown in FIG. 13, the cryptographic system 1300 is comprised of a digital data stream source 1302, an encryption device 1304 and a decryption device 1306. The digital data stream source 1302 is comprised of hardware and/or software configured to generate a data stream. The data stream includes plaintext with a known non-uniform probability distribution. In this regard, it should be understood that the data stream includes a sequence of values ranging from zero (0) to M−1, where M is the characteristic of a Galois field GF[M]. The data stream source 1302 is also comprised of hardware and/or software configured to communicate the data stream to the encryption device 1304.

The encryption device 1004 is comprised of hardware and software implementing an encryption method whereby information is required to decrypt a modified data stream. The information is a function of an internally generated random number sequence and statistical signal processing. In this regard, it should be appreciated that the encryption device 1004 is comprised of a data stream receiving means (DSRM) 1308 and a mixed radix accumulator 750.

The DSRM 1308 is configured to receive a data stream from an external device 1302. The DSRM 1308 is also configured to communicate the data stream to the mixed radix accumulator 750. Accordingly, the DSRM 1308 is electronically connected to the mixed radix accumulator 750.

The mixed radix accumulator 750 is described in detail above in relation to FIG. 7. The discussion provided above is sufficient for understanding the mixed radix accumulator 750. However, it should be noted that the mixed radix accumulator 750 is comprised of hardware and/or software configured to perform arithmetic operations to generate a modified data stream. The arithmetic operations involve computing remainder values utilizing numerical values received from the DSRM 1308. The arithmetic operations also involve modulo operations defined by a mathematical equation: R=S modulo P. R, S and P are defined above in relation to FIG. 7.

However, there are additional conditions placed on the value of P. These conditions include: (a) a fixed value of P that is greater than or equal to the value of M; (b) a value of P that is a fixed value less than M; (c) a time-varying value of P that is constrained to values greater than or equal to M; and (d) a time-varying value of P that may at any point in time be less than M. If P is a fixed value greater than or equal to M, then the result of the mixed radix operations can be decrypted utilizing a symmetric mixed radix accumulator (SMRA). The SMRA has an architecture similar to the mixed radix accumulator 750. However, the SMRA includes a subtractor rather than an adder.

If P is a fixed value less than M, then the result of the mixed radix operations can be decrypted utilizing a probabilistic reconstruction process. This probabilistic reconstruction process relies on knowledge of a statistical distribution for decryption. In this formulation, the decrypted plaintext may map to two (2) or more different possible plaintext values. Adjudication between the set of possible values is required. For example, if the set of possible plaintext is the characters from the English alphabet, then a given input may decrypt to a possible set of {B,T}. There is no immediate information provided as to which output is correct. If a next output decrypts to a possible set {G,H}, then the possible two-tuples of decrypted values are {BG, BH, TG, TH}. The HMM algorithm will use the decrypted values {BG, BH, TG, TH} to estimate {TH} as the most likely sequence of values. In other cases, the correlation algorithm may search for a pre-determined sequence of values used to convey or mask other information, such as key exchange information.

If P is a time-varying value constrained to values greater than or equal to M, then the result of the mixed radix operations can be decrypted uniquely by a modified mixed radix accumulator architecture. Each value in the decryption sequence is likewise modulated as a deterministic function of time. Correlation algorithms are adjusted for a coherent variation in time. If an unintended outsider does not have knowledge of the time-varying sequence, he will find it significantly more computationally difficult to decrypt or forge a transmitted message.

If P is a time-varying value that may at any point in time be less than M, then the result of the mixed radix operations can be decrypted using a modified mixed radix accumulator structure. In addition to adjusting the time-varying P sequence, a correlation based algorithm is applied. The correlation based algorithm further complicates an ability of an attacker to decrypt or mimic a transmitted message.

Referring again to FIG. 13, the mixed radix accumulator 750 is also comprised of hardware and software configured to communicate a modified data stream to the decryption device 1306. The decryption device 1306 is configured to decrypt the received modified data stream. In this regard, it should be appreciated that the decryption device 1306 is comprised of hardware and software implementing an HMM or other similar correlation-based mathematical structure. The decryption device 1306 is also configured to communicate the decrypted data to an external device (not shown).

A person skilled in the art will appreciate that the correlation-based cryptographic system 1300 illustrates an exemplary architecture of a cryptographic system implementing the present invention. However, the invention is not limited in this regard and any other cryptographic system architecture can be used without limitation. For example, the correlation-based cryptographic system 1300 can be adjusted in accordance with the mixed radix generator architectures of FIG. 8 and FIG. 9. In such a scenario, the random number generator 802 of FIG. 8 can be replaced with a data stream source. Similarly, the random number generator 902 of FIG. 9 can be replaced with a data stream source.

In light of the foregoing description of the invention, it should be recognized that the present invention can be realized in hardware, software, or a combination of hardware and software. A method of performing a mixed radix ring generation and conversion to produce a random number sequence with chosen statistical characteristics over all equivalence classes of a Galois field can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A cryptographic system, comprising:
a data stream receiving circuit configured to receive an input data stream;
a number generator circuit configured to generate a first sequence of numbers contained within a punctured Galois field GF'[M] in which at least one element of a plurality of elements comprising a Galois field GF[M], has been removed;
a mixed radix accumulator circuit electronically connected to said number generator circuit and configured to
(1) perform a first modification to a first number in said first sequence of numbers comprising summing said first number with a result of a first modulo P operation plus a fixed offset performed on a second number of said first sequence that proceeds said first number, where a value of M is mutually prime with respect to a value of P and all of a plurality of relatively prime factors of P including $p_1, p_2, p_3 \ldots, p_k$,
(2) subsequent to said first modification, perform a second modification to said first number comprising a second modulo P operation, and
(3) repeating said first and second modification for a plurality of numbers comprising said first sequence of numbers to generate a second sequence of numbers;
a plurality of arithmetic operator circuits each configured to perform a third modification on said second sequence of numbers for simultaneously generating a plurality of output number sequences from said second sequence of numbers, said third modification comprising a plurality of modulo p operations simultaneously performed upon each number in said second sequence of numbers to generate said plurality of output number sequences, where p includes a plurality of values selected from a group comprising $p_1, p_2, p_3, \ldots, p_k$; and
an encryptor circuit electronically connected to said data stream receiving circuit and said plurality of arithmetic operator circuits, said encryptor circuit configured to generate a modified data stream by incorporating or combining at least one of said plurality of output number sequences with said input data stream.

2. The cryptographic system according to claim 1, wherein said number generator circuit comprises a pseudo-random number generator configured to generate a pseudo-random sequence of numbers containing statistical artifacts relating to said generation of said first sequence of numbers, and wherein said statistical artifact is eliminated by said mixed radix accumulator circuit.

3. The cryptographic system according to claim 1, wherein said number generator circuit is configured to exhaustively produce said first sequence of numbers by using a mapping which is periodically repeated.

4. The cryptographic system according to claim 3, wherein said mapping includes a combination of an additive mapping and a multiplicative mapping.

5. The cryptographic system according to claim 4, wherein said additive mapping and said multiplicative mapping in combination include repeated computations of an irreducible polynomial over said Galois field GF[M].

6. The cryptographic system according to claim 1, wherein said second number precedes said first number by one position.

7. The cryptographic system according to claim 1, wherein said second number precedes said first number by N positions, where N is greater than 1.

8. The cryptographic system according to claim 1, wherein said first sequence of numbers is limited to a finite number of elements M defined by said Galois field GF[M], said second sequence of numbers has statistical artifacts that are evenly distributed over a plurality of equivalence classes of said Galois field GF[P], and wherein said plurality of equivalence classes include an equivalence class for each integer 0, 1, ..., P–1.

9. The cryptographic system according to claim 1, wherein said first sequence is operated upon by a filter structure configured to perform calculations inside a Galois field of equal size to the second sequence.

10. The cryptographic system according to claim 1, wherein said encryptor circuit includes at least one of a multiplier, an adder, a digital logic device and a feedback mechanism.

11. The cryptographic system according to claim 1, wherein said encryptor circuit is configured to perform a standard multiplication operation, a multiplication in a Galois extension field operation, an addition modulo q operation, a subtraction modulo q operation or a bitwise logic operation.

12. The cryptographic system according to claim 1, further comprising a second number generator circuit and a second mixed radix accumulator circuit configured in combination to generate a decryption sequence.

13. The cryptographic system according to claim 12, further comprising a decryptor circuit coupled to said second mixed radix accumulator circuit, said decryptor circuit configured to produce decrypted data by performing a decryption method utilizing said modified data stream and said decryption sequence.

14. A cryptographic system, comprising:
a data stream generating circuit configured to generate an input data stream including a first sequence of numbers with a known non-uniform probability distribution and contained within a punctured Galois field GF'[M] in which at least one element of a plurality of elements comprising a Galois field GF[M], has been removed;
a mixed radix accumulator circuit electronically connected to said data stream generating circuit and configured to
(1) perform a first modification to a first number in said first sequence of numbers comprising summing said first number with a result of a modulo P operation plus a fixed offset performed on a second number of said first sequence that proceeds said first number, where a value of M is mutually prime with respect to a value of P and all of a plurality of relatively prime factors of P including $p_1, p_2, p_3, \ldots, p_k$,
(2) subsequent to said first modification, perform a second modification to said first number comprising a modulo P operation, and
(3) repeating said first and second modifications for a plurality of numbers comprising said first sequence of numbers to generate a second sequence of numbers;
a plurality of arithmetic operator circuits each configured to perform a third modification on said second sequence of numbers for simultaneously generating a plurality of output number sequences from said second sequence of numbers, said third modification comprising a plurality of modulo p operations simultaneously performed upon each number in said second sequence of numbers to generate said plurality of output number sequences, where p includes a plurality of values selected from a group comprising $p_1, p_2, p_3, \ldots, p_k$; and
a cryptographic circuit configured to combine at least one of said plurality of output number sequences with a data signal to encrypt or decrypt said data signal.

15. The cryptographic system according to claim 14, wherein P is greater than M, P is equal to M, or P is a fixed value less than M.

16. The cryptographic system according to claim 14, wherein P is a time-varying value constrained to values greater than M, P is a time-varying value constrained to values equal to M, or P is a time-varying value less than M at a given point in time.

17. The cryptographic system according to claim 14, wherein said cryptographic circuit comprises a decryption device coupled to said plurality of arithmetic operator circuits and configured to produce decrypted data by performing a decryption method implementing a correlation-based mathematical structure.

18. The cryptographic system according to claim 17, wherein said correlation-based mathematical structure is a Hidden Markov Model.

19. A method for encrypting and decrypting an input data stream, comprising the steps of:
receiving, by at least one electronic circuit, an input data stream;
generating, by said electronic circuit, a first sequence of numbers contained within a punctured Galois field GF'[M] in which at least one element of a plurality of elements comprising a Galois field GF[M], has been removed;
performing, by said electronic circuit, a first modification to a first number in said first sequence of numbers comprising summing said first number with a result of a first modulo P operation plus a fixed offset performed on a second number of said first sequence that proceeds said first number, where a value of M is relatively prime with respect to a value of P and all of a plurality of relatively prime factors of P including $p_1, p_2, p_3, \ldots, p_k$;
performing, by said electronic circuit, a second modification subsequent to said first modification to said first number comprising a second modulo P operation;
repeating, by said electronic circuit, said first and second modifications for a plurality of numbers comprising said first sequence of numbers to generate a second sequence of numbers;
performing, by said electronic circuit, a third modification on said second sequence of numbers for simultaneously generating a plurality of output number sequences from said second sequence of numbers; and
generating, by said electronic circuit, a modified data stream by combining at least one of said plurality of output number sequences with said input data stream;
wherein said third modification comprises a plurality of modulo p operations simultaneously performed upon each number in said second sequence of numbers to generate said plurality of output number sequences, where p includes a plurality of values selected from a group comprising $p_1, p_2, p_3, \ldots, p_k$.

20. The method according to claim 19, wherein said generating step further comprises performing a standard multiplication operation, a multiplication in a Galois extension field, an addition modulo q operation, a subtraction modulo q operation, or a bitwise logic operation.

21. The method according to claim 19, further comprising generating, by said electronic circuit, a decryption sequence, wherein said decryption sequence is a random number sequence having chosen statistical artifacts over all equivalence classes of a Galois Field GF[P].

22. The method according to claim 21, further comprising generating, by said electronic circuit, a decrypted data stream by performing a decryption method utilizing said modified data stream and said decryption sequence.

* * * * *

UNITED STATES PATENT AND TRADEMARK OFFICE
CERTIFICATE OF CORRECTION

| | | |
|---|---|---|
| PATENT NO. | : 8,320,557 B2 | Page 1 of 1 |
| APPLICATION NO. | : 12/117086 | |
| DATED | : November 27, 2012 | |
| INVENTOR(S) | : Alan J. Michaels | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this
Twenty-sixth Day of August, 2014

Michelle K. Lee
*Deputy Director of the United States Patent and Trademark Office*